US012682156B2

(12) United States Patent
Cohen

(10) Patent No.: US 12,682,156 B2
(45) Date of Patent: Jul. 14, 2026

(54) METHOD AND APPARATUS FOR TRACKING THE PROVENANCE OF INFORMATION

(71) Applicant: The Johns Hopkins University, Baltimore, MD (US)

(72) Inventor: Jonathan D. Cohen, Glenwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 561 days.

(21) Appl. No.: 18/109,565

(22) Filed: Feb. 14, 2023

(65) Prior Publication Data

US 2023/0259699 A1 Aug. 17, 2023

Related U.S. Application Data

(60) Provisional application No. 63/310,846, filed on Feb. 16, 2022.

(51) Int. Cl.
*G06F 40/194* (2020.01)
*G06F 40/103* (2020.01)
*G06N 5/04* (2023.01)

(52) U.S. Cl.
CPC .......... *G06F 40/194* (2020.01); *G06F 40/103* (2020.01); *G06N 5/04* (2013.01)

(58) Field of Classification Search
CPC .................................................... G06F 40/194
See application file for complete search history.

(56) References Cited

U.S. PATENT DOCUMENTS

| | | | | |
|---|---|---|---|---|
| 9,003,529 | B2 | 4/2015 | Lospinuso et al. | |
| 9,111,095 | B2 | 8/2015 | Cohen | |
| 9,910,985 | B2 | 3/2018 | Cohen | |
| 2006/0242140 | A1* | 10/2006 | Wnek | G06F 17/30 |
| 2014/0223565 | A1* | 8/2014 | Cohen | G06F 21/56 |
| 2022/0319143 | A1* | 10/2022 | Wyle et al. | G06V 10/23 |

* cited by examiner

*Primary Examiner* — James J Debrow
(74) *Attorney, Agent, or Firm* — Noah J. Hayward

(57) ABSTRACT

A method for determining a flow of information within a plurality of documents is provided. The method may include receiving the plurality of documents with each document having document content and a document timestamp. Based on the documents, the method may include constructing an inferred document causality forest by determining causal edges of the inferred document causality forest based on the document contents and the document timestamps. The inferred document causality forest may indicate a temporal flow of information from at least one earliest causal document of the plurality of documents. Further, each causal edge may extend from a node for an antecedent document to a node for a subsequent document that has a similarity above a similarity threshold and a document timestamp of the antecedent document may be earlier in time than a document timestamp of the subsequent document.

18 Claims, 19 Drawing Sheets

400

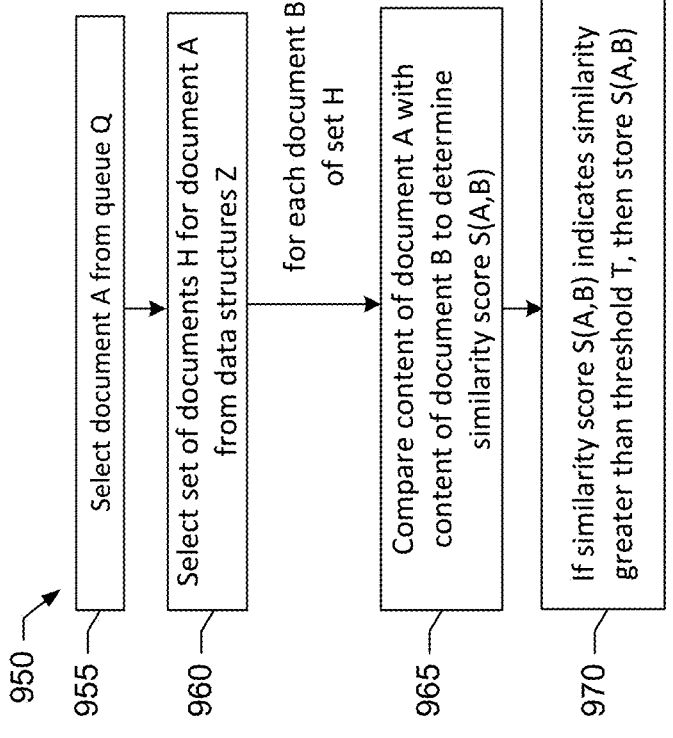

950

955 — Select document A from queue Q

960 — Select set of documents H for document A from data structures Z for each document B of set H 965 — Compare content of document A with content of document B to determine similarity score S(A,B)

970 — If similarity score S(A,B) indicates similarity greater than threshold T, then store S(A,B)

905 — Determine similarity threshold T

910 — Receive plurality of documents R

915 — Receive plurality of documents U

920 — Construct data structures Z to represent each document of plurality of documents R 925 — Construct queue Q of documents for comparison 930 — Determine similarity for each document A of queue Q to each document B of data structures 935 — Construct inferred document causality forest

FIG. 9A

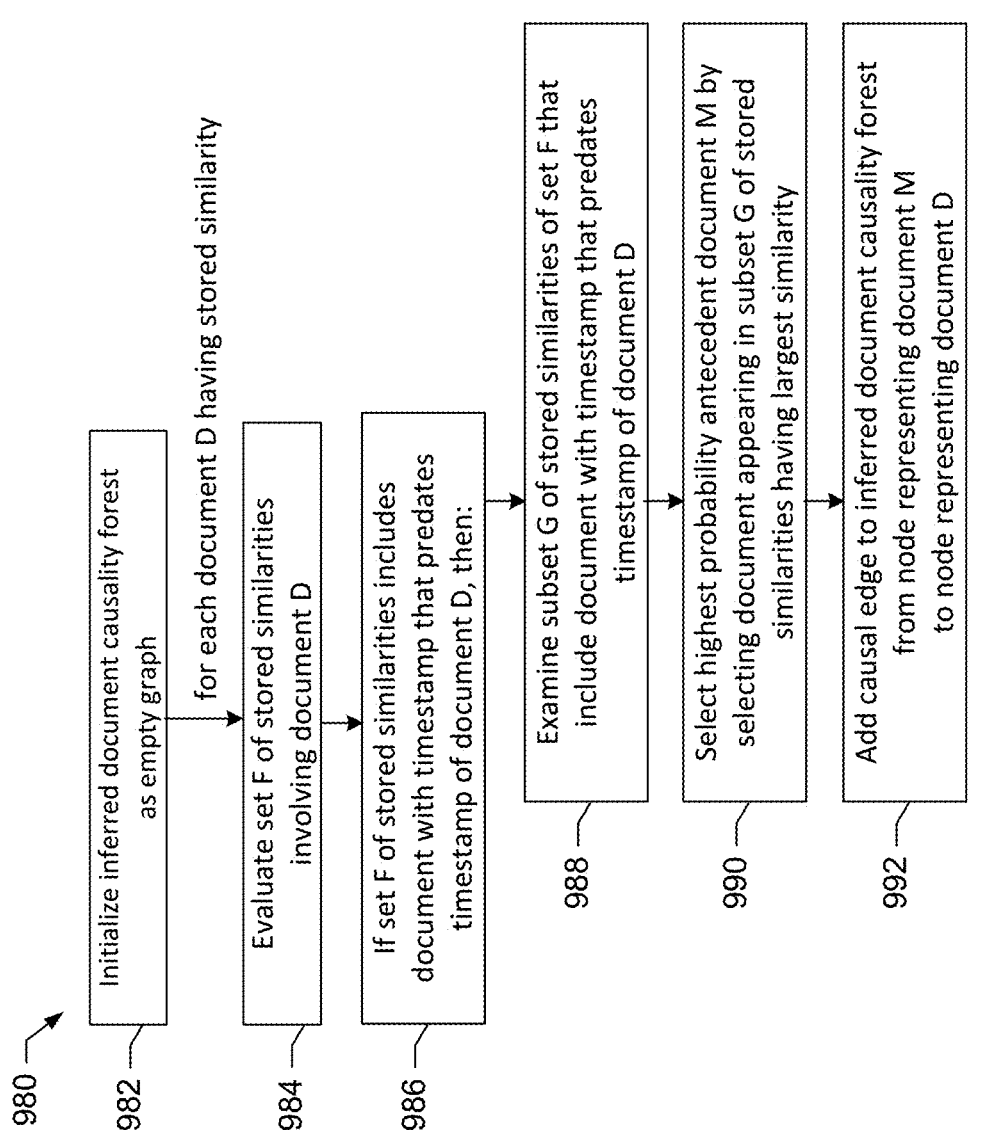

Initialize inferred document causality forest as empty graph

982 for each document D having stored similarity

Evaluate set F of stored similarities involving document D

984

If set F of stored similarities includes document with timestamp that predates timestamp of document D, then:

986

Examine subset G of stored similarities of set F that include document with timestamp that predates timestamp of document D

988

Select highest probability antecedent document M by selecting document appearing in subset G of stored similarities having largest similarity

990

Add causal edge to inferred document causality forest from node representing document M to node representing document D

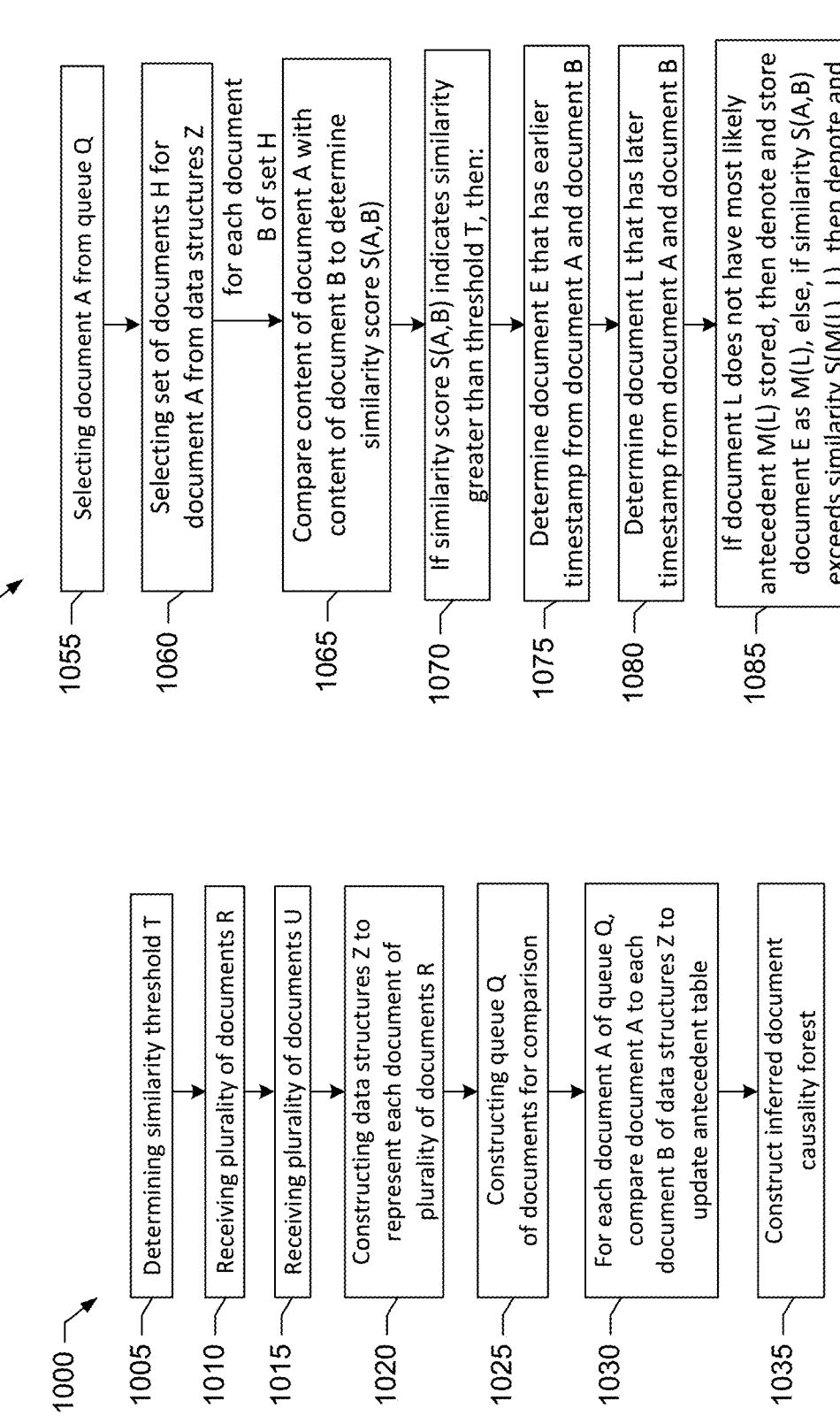

1050

1055   Selecting document A from queue Q

1060   Selecting set of documents H for document A from data structures Z for each document B of set H 1065   Compare content of document A with content of document B to determine similarity score S(A,B)

1070   If similarity score S(A,B) indicates similarity greater than threshold T, then:

1075   Determine document E that has earlier timestamp from document A and document B 1080   Determine document L that has later timestamp from document A and document B 1085   If document L does not have most likely antecedent M(L) stored, then denote and store document E as M(L), else, if similarity S(A,B) exceeds similarity S(M(L), L), then denote and store document E as M(L)

1005   Determining similarity threshold T

1010   Receiving plurality of documents R

1015   Receiving plurality of documents U

1020   Constructing data structures Z to represent each document of plurality of documents R 1025   Constructing queue Q of documents for comparison 1030   For each document A of queue Q, compare document A to each document B of data structures Z to update antecedent table 1035   Construct inferred document causality forest

1105 — Determine similarity threshold T

1110 — Implement filter F to select documents of interest

1115 — Receive plurality of documents U

1120 — Initialize data structures Z

1125 — Construct queue Q of documents for comparison

1130 — For each document A of queue Q, compare document A to document B of data structures Z to update antecedent table 1135 — Construct inferred document causality forest Receiving plurality of documents, each document within plurality of documents including document content and document timestamp — 1302

Constructing inferred document causality forest based on plurality of documents by determining causal edges of inferred document causality forest between documents based on document contents and document timestamps — 1304

1300

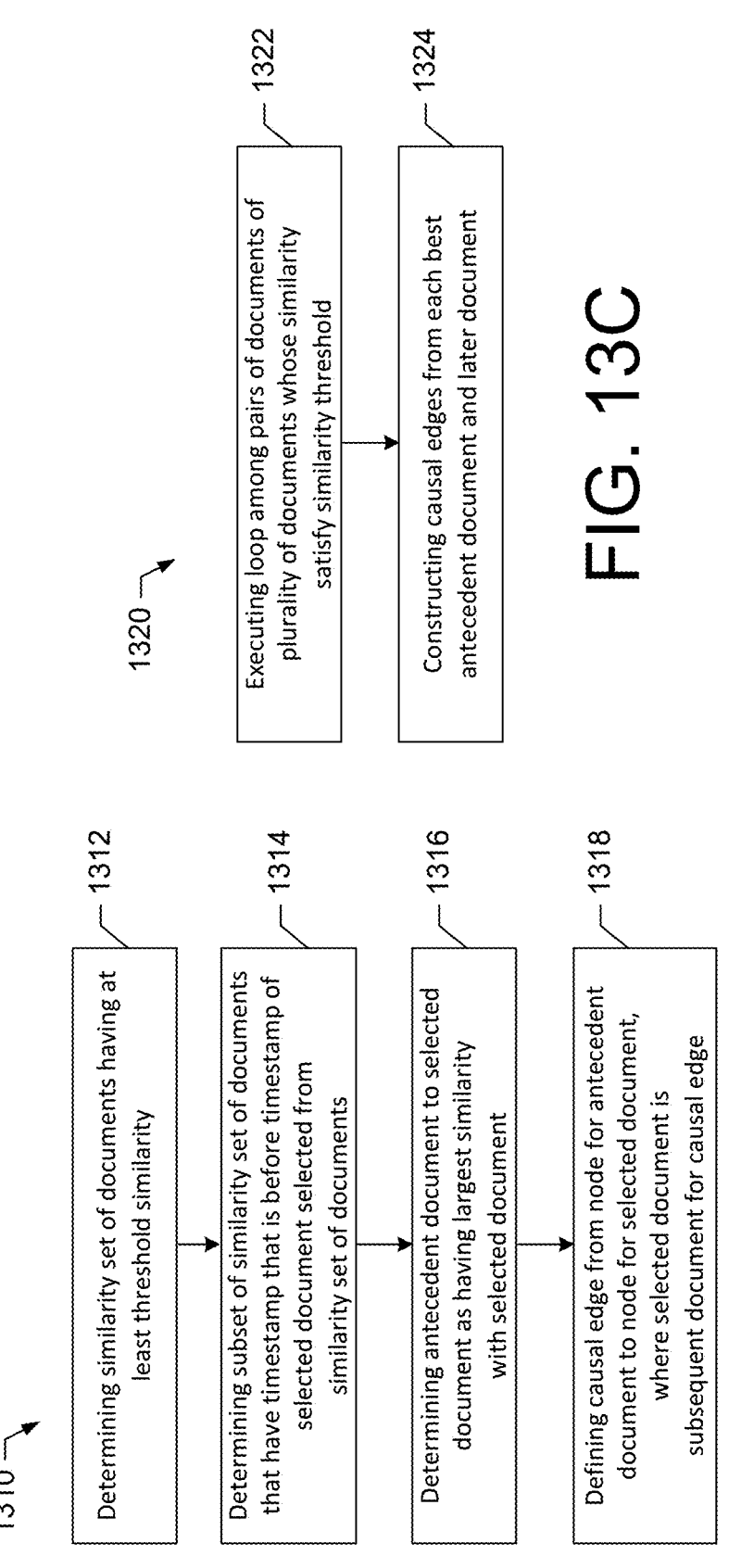

1320

Executing loop among pairs of documents of plurality of documents whose similarity satisfy similarity threshold — 1322

Constructing causal edges from each best antecedent document and later document — 1324

Determining similarity set of documents having at least threshold similarity — 1312

Determining subset of similarity set of documents that have timestamp that is before timestamp of selected document selected from similarity set of documents — 1314

Determining antecedent document to selected document as having largest similarity with selected document — 1316

Defining causal edge from node for antecedent document to node for selected document, where selected document is subsequent document for causal edge — 1318

FIG. 13B

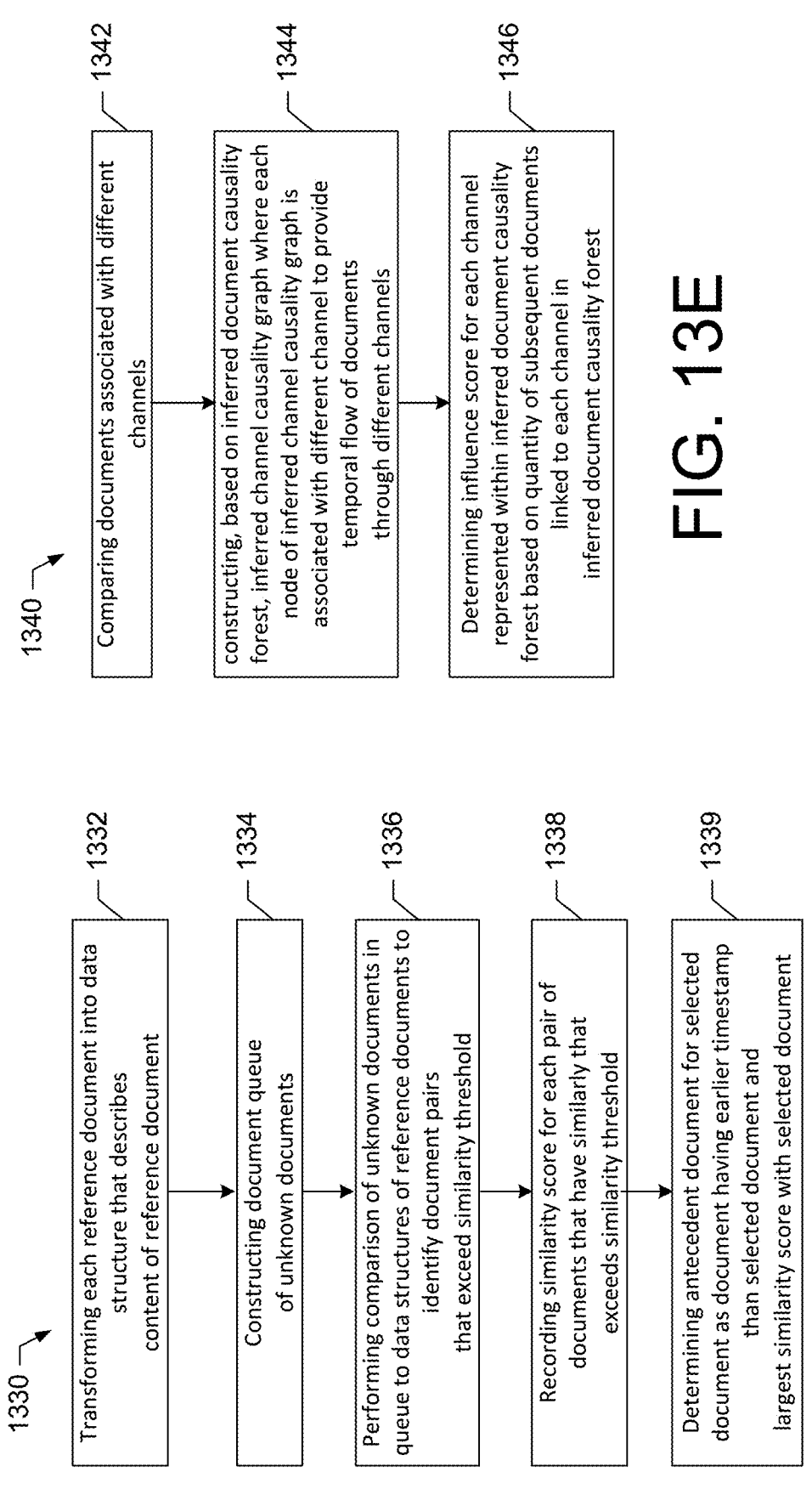

1340

Comparing documents associated with different channels — 1342 constructing, based on inferred document causality forest, inferred channel causality graph where each node of inferred channel causality graph is associated with different channel to provide temporal flow of documents through different channels — 1344

Determining influence score for each channel represented within inferred document causality forest based on quantity of subsequent documents linked to each channel in inferred document causality forest — 1346

Transforming each reference document into data structure that describes content of reference document — 1332

Constructing document queue of unknown documents — 1334

Performing comparison of unknown documents in queue to data structures of reference documents to identify document pairs that exceed similarity threshold — 1336

Recording similarity score for each pair of documents that have similarly that exceeds similarity threshold — 1338

Determining antecedent document for selected document as document having earlier timestamp than selected document and largest similarity score with selected document — 1339

FIG. 13D

METHOD AND APPARATUS FOR TRACKING THE PROVENANCE OF INFORMATION

CROSS-REFERENCE TO RELATED APPLICATIONS

This application claims priority to and the benefit of prior-filed, co-pending U.S. Provisional Application No. 63/310,846 filed on Feb. 16, 2022, the entire content of which is hereby incorporated herein by reference in its entirety.

TECHNICAL FIELD

Exemplary embodiments generally relate to information technology, and more specifically relate to technology for tracking the movement and origin of shared information.

BACKGROUND

In the current Information Age, the ability to create and share content is limitless. Content may be any type of information including textual, audio, and video-based information. Computers and smartphones provide technology platforms that allow any individual to create and distribute content via uncountable Internet channels such as via social media platforms and the like.

As a result of the ease of content development and the frictionless distribution channels, the original source of content can be unknown to individuals that are consuming the content. Since the origin of the content is often unknown, the reliability of the source and the content itself cannot be ascertained. This is particularly problematic as derivative content is created and re-shared. In some situations, identifying the original source of the content could be important to an investigation of a related incident to identify user accounts or individuals that were involved in the creation of the content.

As such, a solution that is capable of determining an origin or the provenance of the content that has been distributed on a network, such as the Internet, would be beneficial.

BRIEF SUMMARY

According to some non-limiting, example embodiments, a method for determining a flow of information within a plurality of documents is provided. The example method may include receiving the plurality of documents, where each document within the plurality of documents includes document content and a document timestamp. The example method may further include constructing an inferred document causality forest based on the plurality of documents by determining causal edges of the inferred document causality forest between the documents based on the document contents and the document timestamps. The inferred document causality forest may include a plurality of causal edges extending between nodes that are associated with documents of the plurality of documents. Further, the inferred document causality forest may indicate a temporal flow of information from at least one earliest causal document of the plurality of documents. In this regard, each causal edge may extend from a node for an antecedent document to a node for a subsequent document that has a similarity above a similarity threshold and a document timestamp of the antecedent document may be earlier in time than a document timestamp of the subsequent document. Also, for each causal edge, each antecedent document and each subsequent document may be one of the documents of the plurality of documents.

According to some example embodiments, an apparatus for determining a flow of information within a plurality of documents is provided. The apparatus may include processing circuitry configured to receive the plurality of documents, where each document within the plurality of documents includes document content and a document timestamp. The processing circuitry may also be configured to construct an inferred document causality forest based on the plurality of documents by determining the causal edges of the inferred document causality forest between the documents based on the document contents and the document timestamps. The inferred document causality forest may include a plurality of causal edges extending between nodes that are associated with documents of the plurality of documents. The inferred document causality forest may indicate a temporal flow of information from at least one earliest causal document of the plurality of documents. Further, each causal edge may extend from a node for an antecedent document to a node for a subsequent document that has a similarity above a similarity threshold and a document timestamp of the antecedent document being earlier in time than a document timestamp of the subsequent document. Further, for each causal edge, each antecedent document and each subsequent document is one of the documents of the plurality of documents.

BRIEF DESCRIPTION OF THE SEVERAL VIEWS OF THE DRAWINGS

Figure 1:
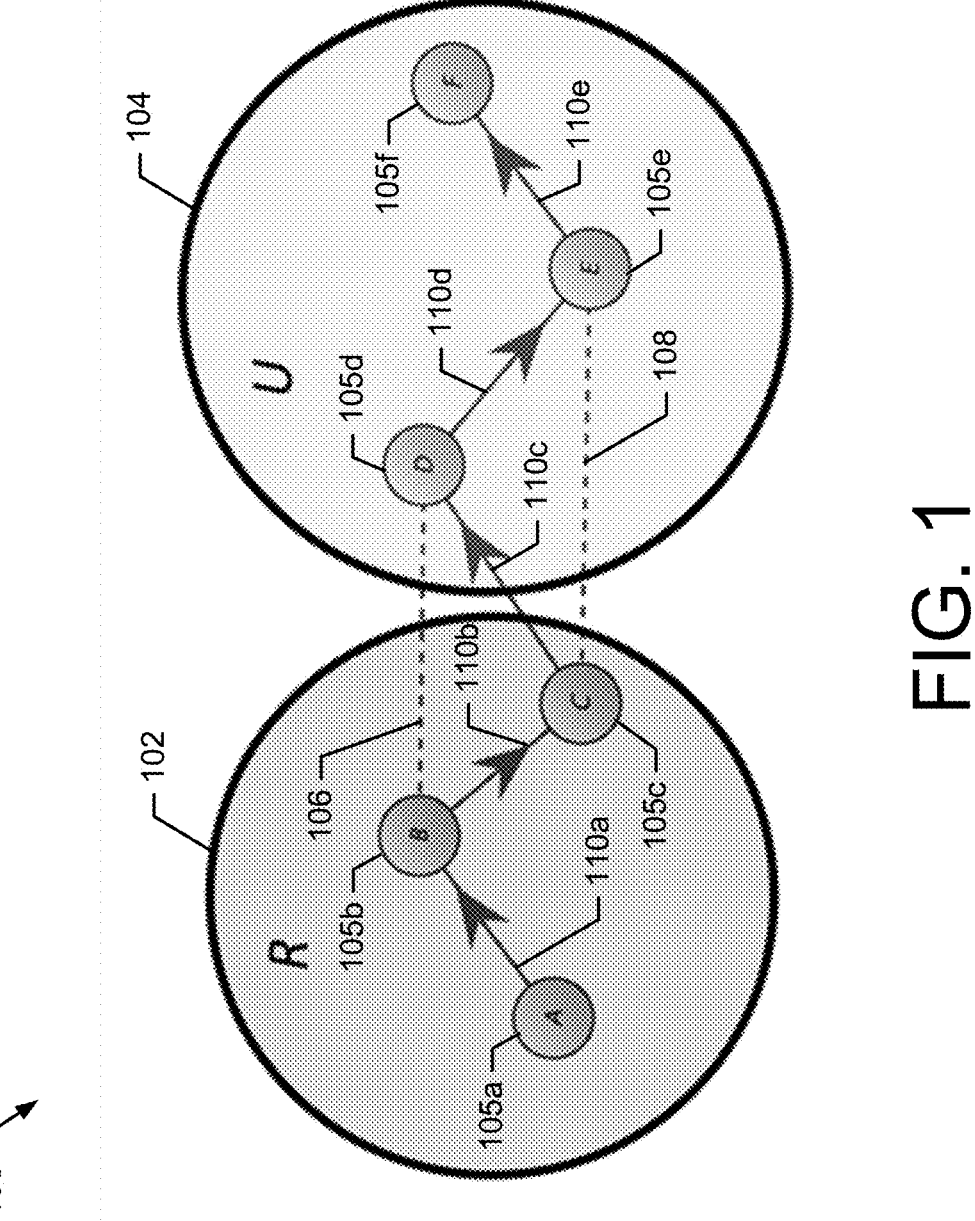
Figure 2:
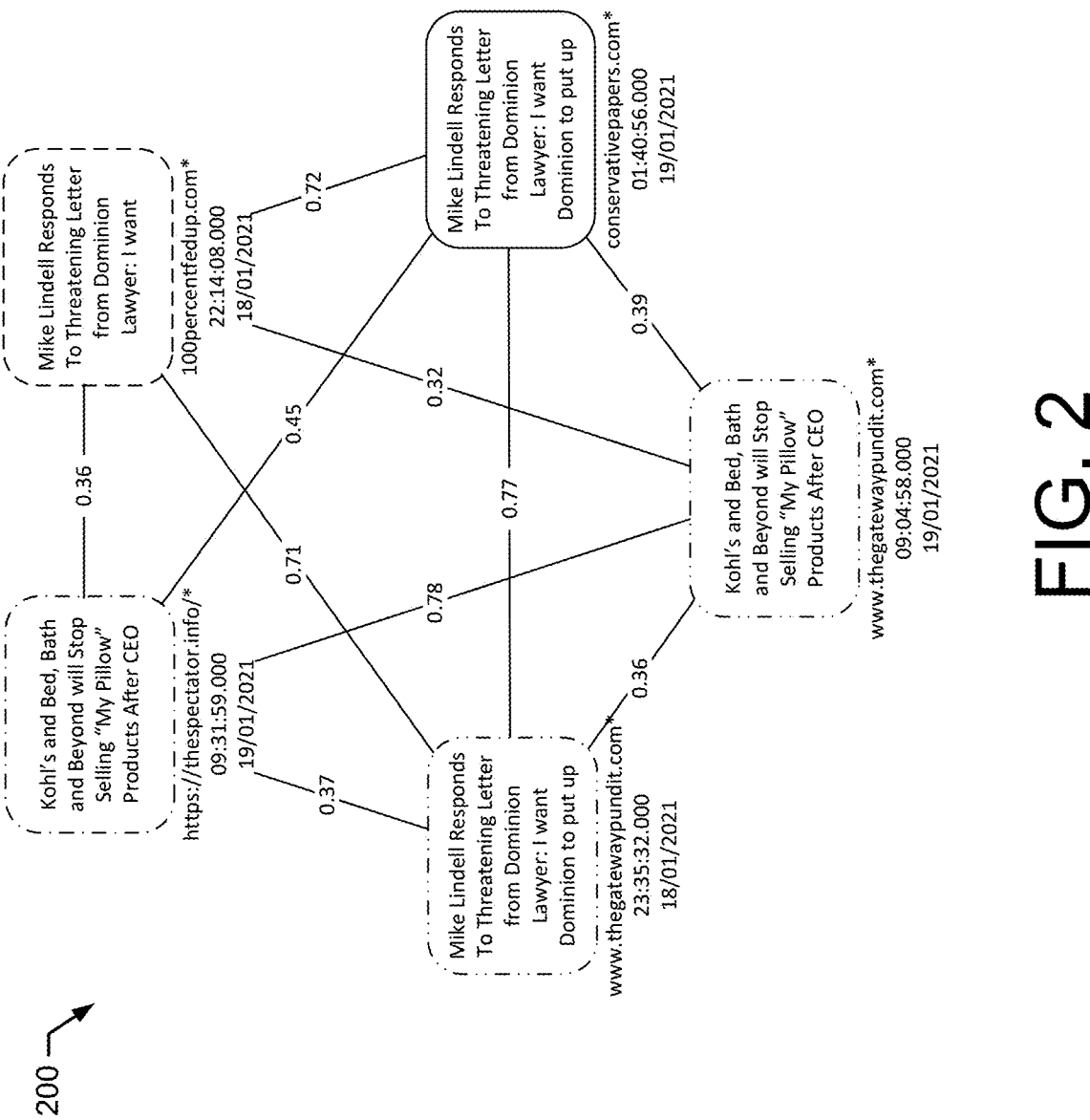
Figure 3:
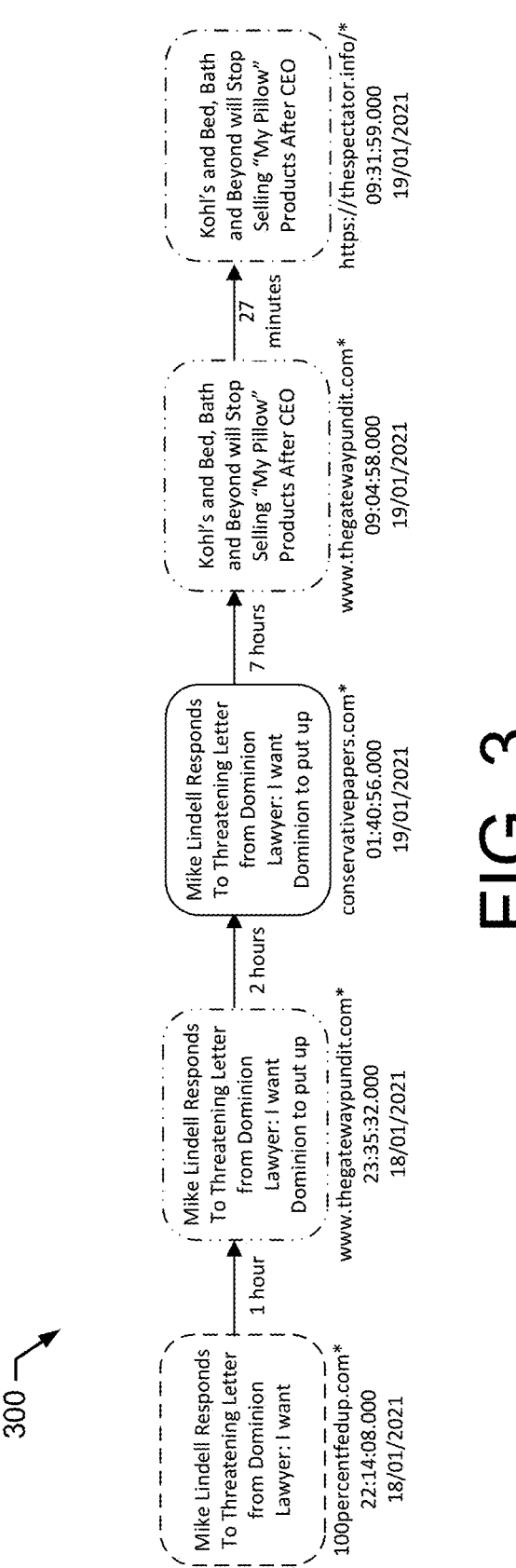
Figure 4:
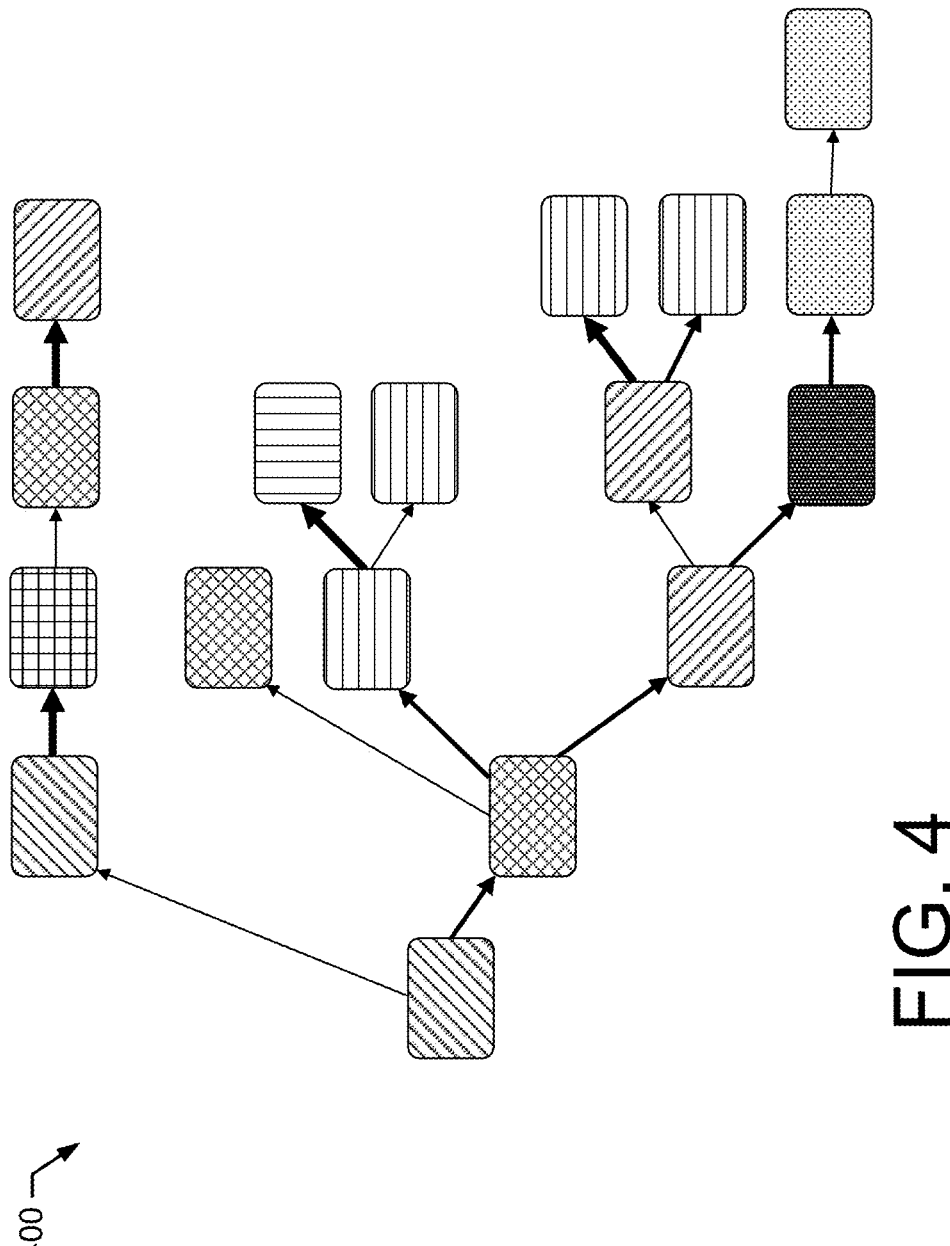
Figure 5:
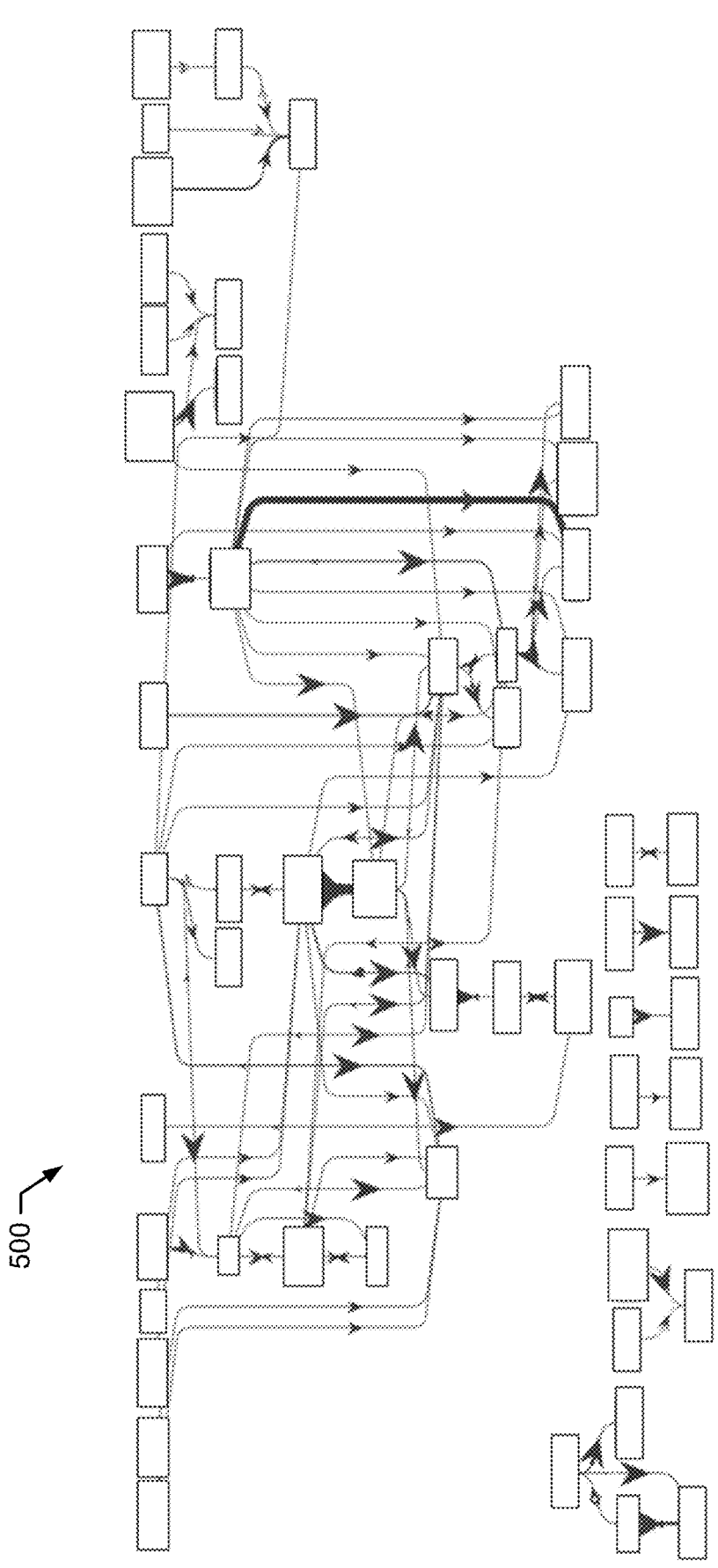
Figure 6:
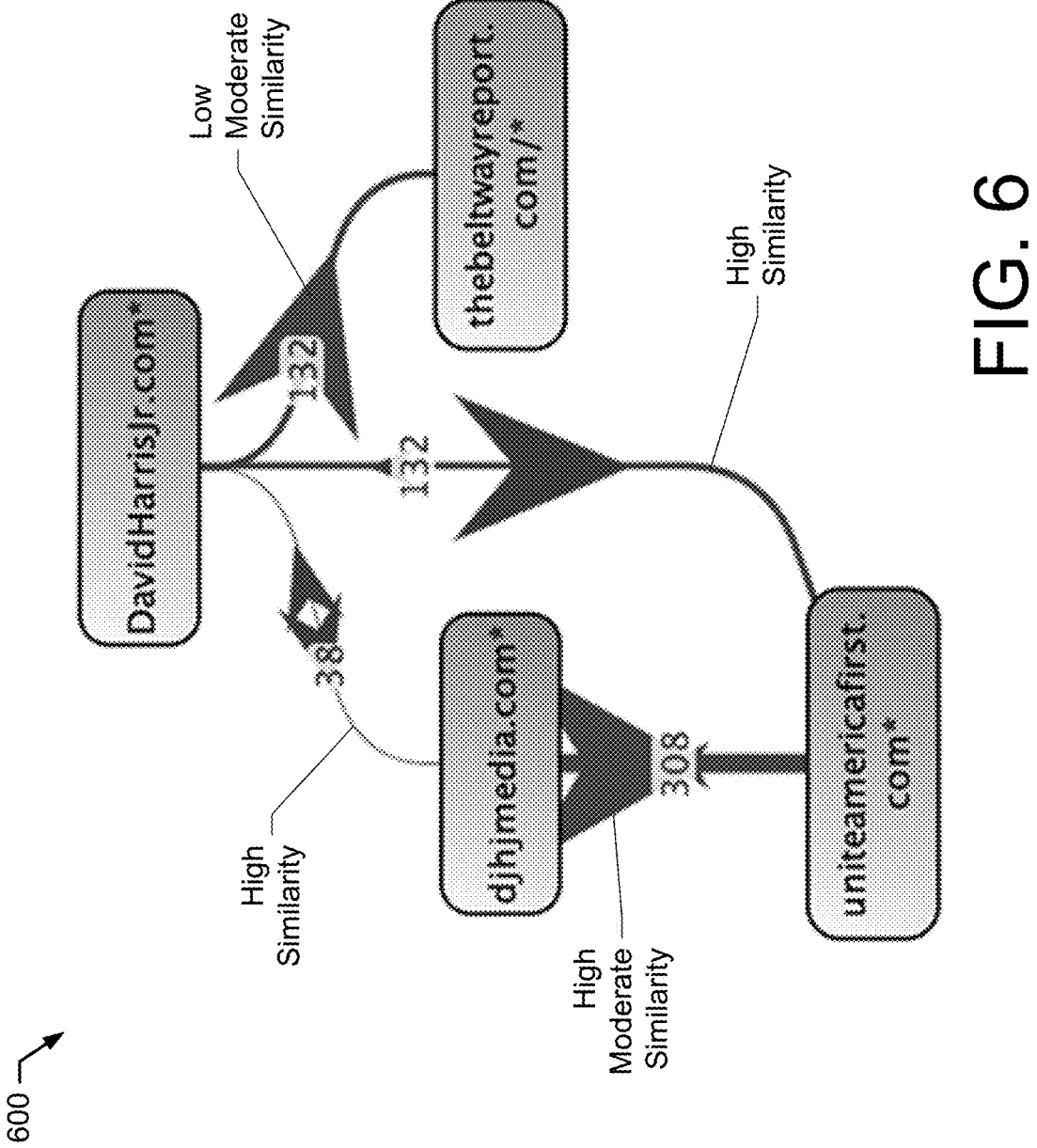
Figure 7:
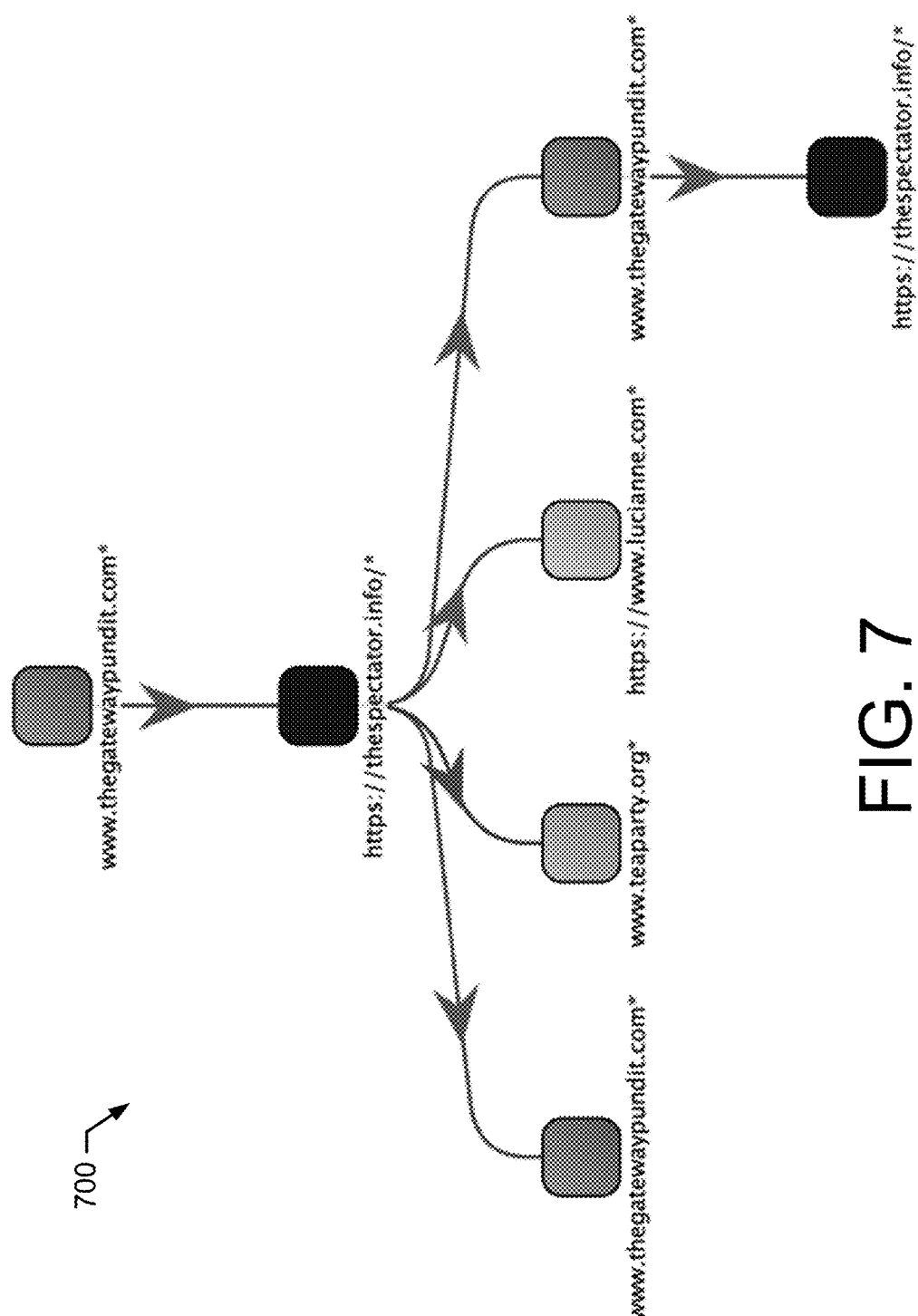
Figure 8:
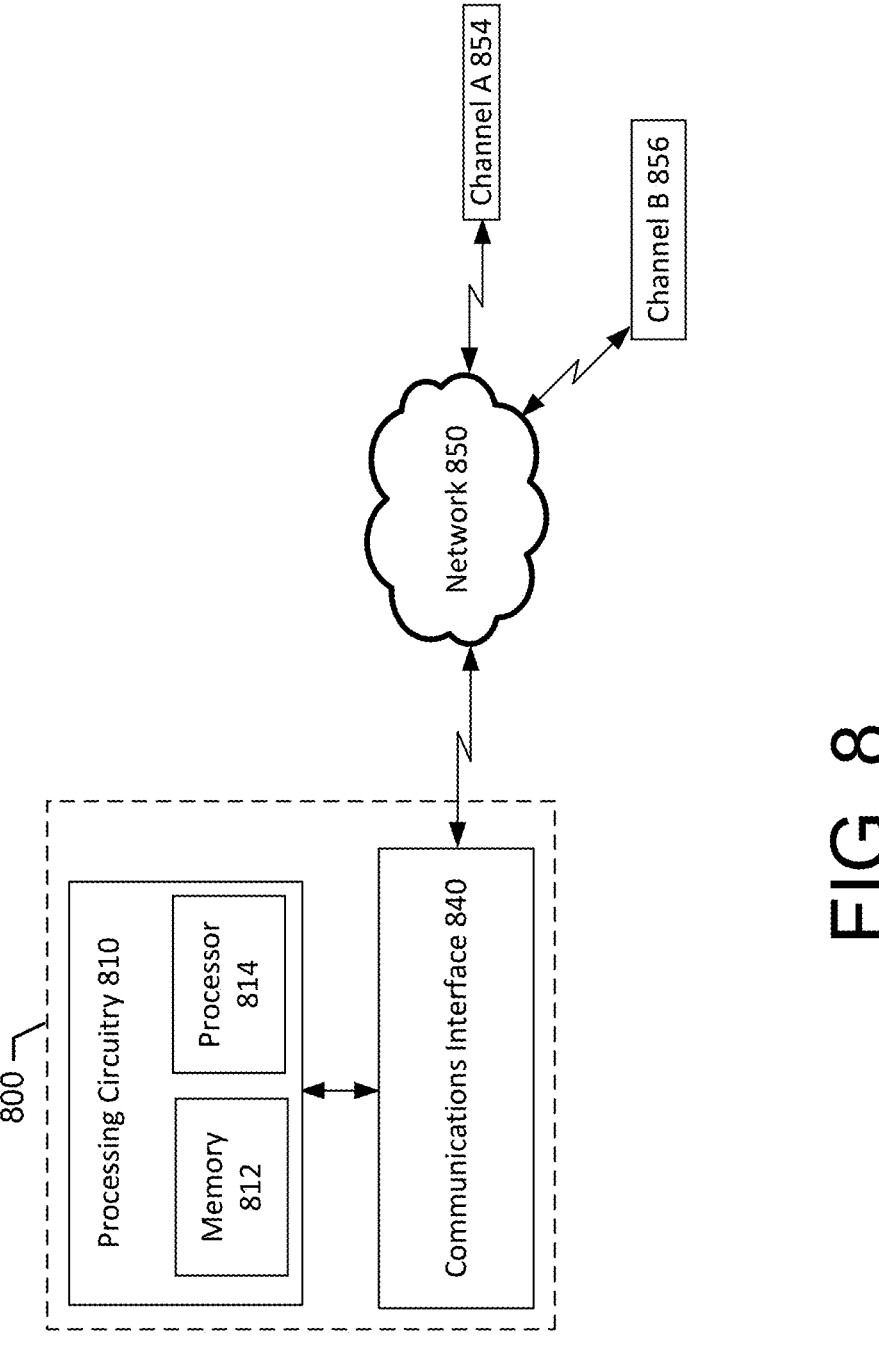
Figure 10C:
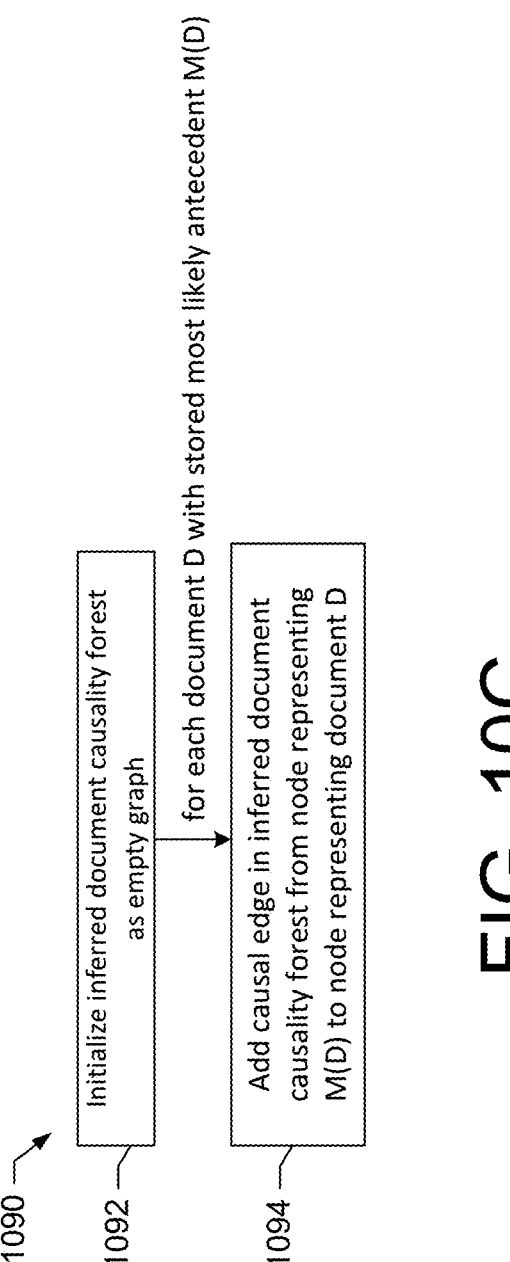
Figure 11A:
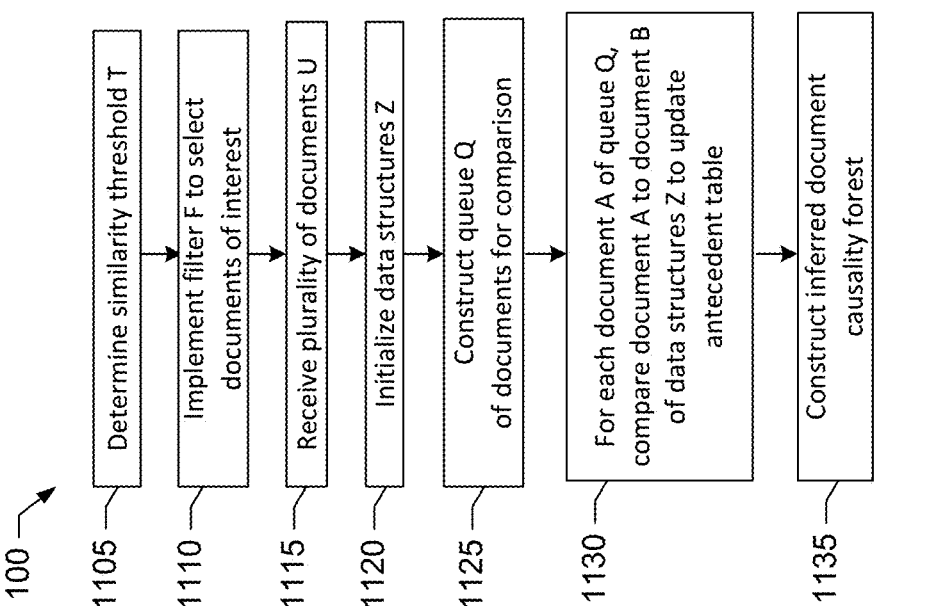
Figure 11B:
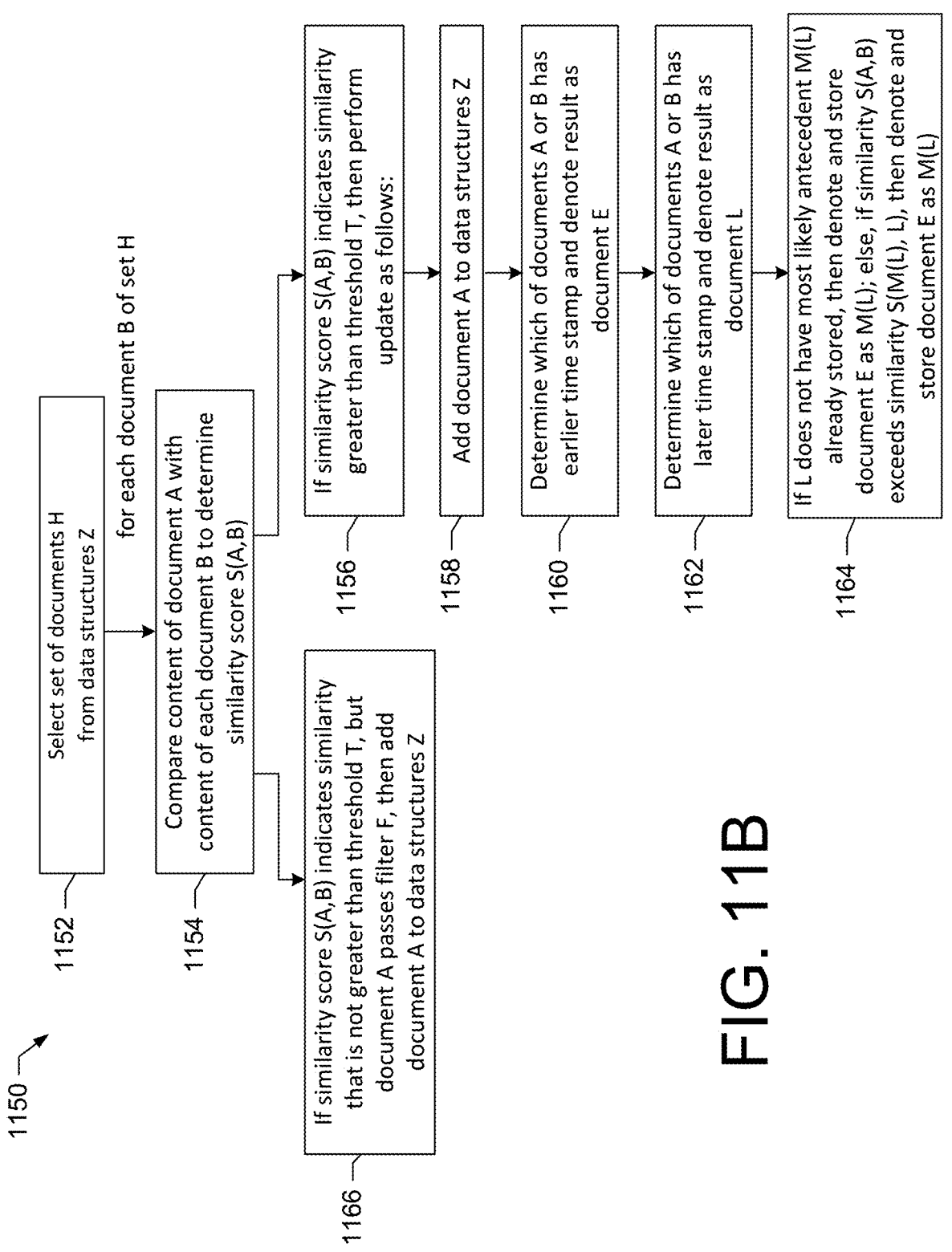
Figure 11C:
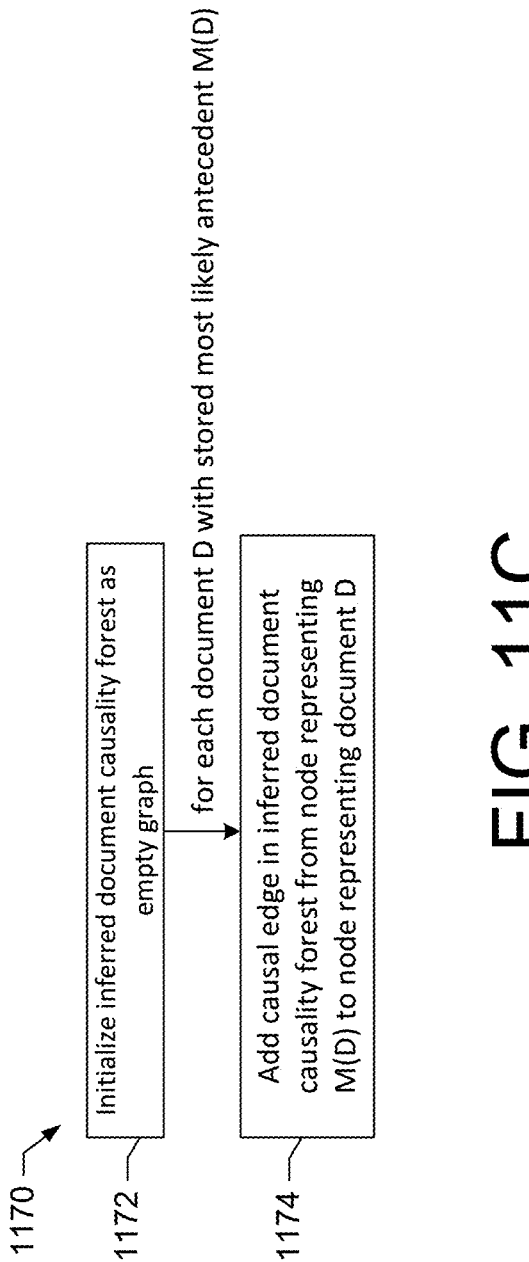
Figure 12:
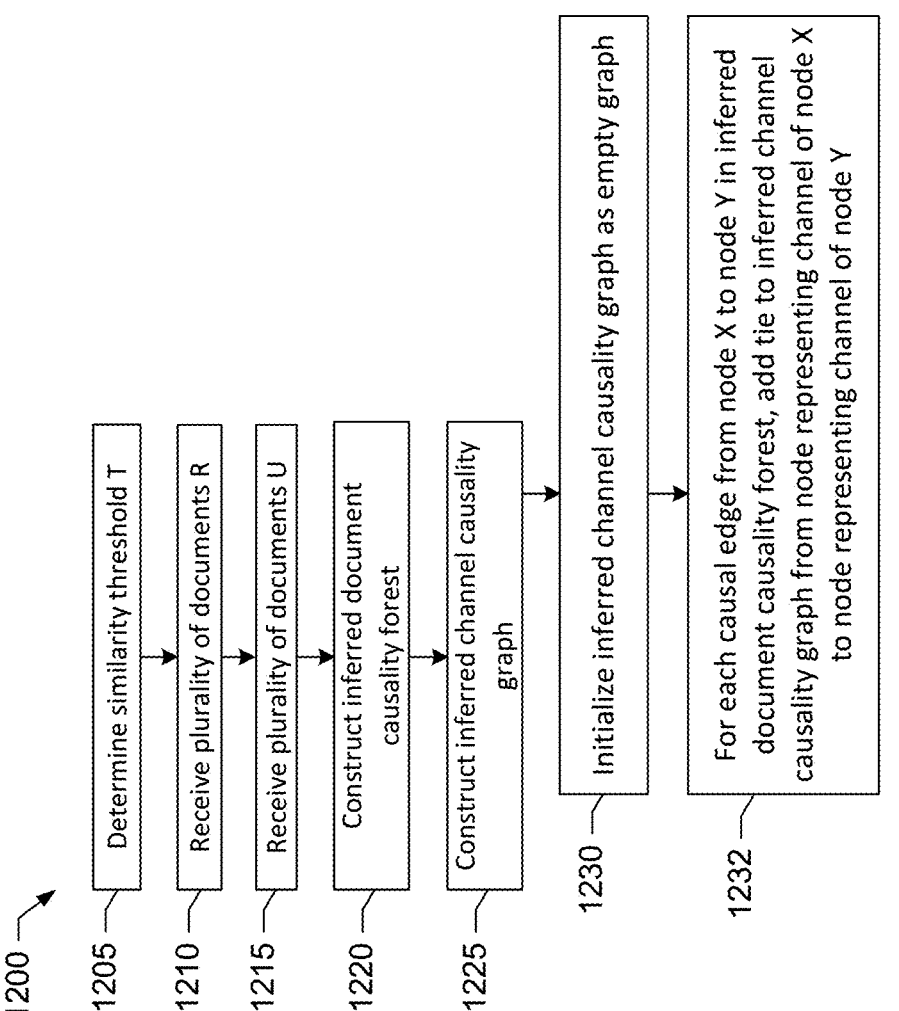
Figure 13A:
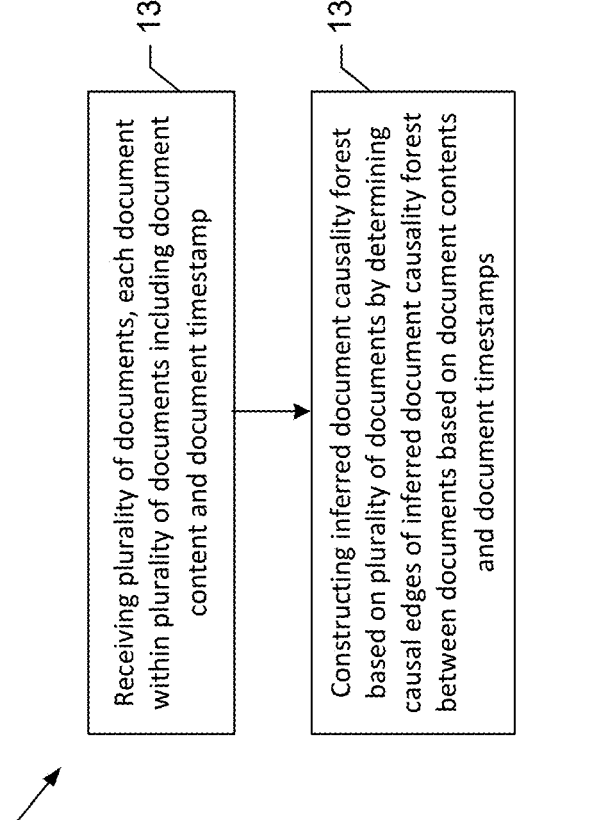

Having thus described some non-limiting, example embodiments in general terms, reference will now be made to the accompanying drawings, which are not necessarily drawn to scale, and wherein:

FIG. 1 illustrates a structure and links for document similarity relationships according to some example embodiments;

FIG. 2 illustrates an example similarity graph according to some example embodiments;

FIG. 3 illustrates an example inferred document causality forest according to some example embodiments;

FIG. 4 illustrates another example inferred document causality forest according to some example embodiments;

FIG. 5 illustrates another example inferred channel causality graph according to some example embodiments;

FIG. 6 illustrates a zoomed or detailed portion of the inferred channel causality graph of FIG. 5 according to some example embodiments;

FIG. 7 illustrates another example inferred document causality forest according to some example embodiments;

FIG. 8 illustrates an example apparatus for determining and tracking the provenance of information according to some example embodiments;

FIGS. 9A-9C illustrate example methods for constructing an inferred document causality forest according to some example embodiments;

FIGS. 10A-10C illustrate additional example methods for constructing an inferred document causality forest according to some example embodiments;

FIGS. 11A-11C illustrate additional example methods for constructing an inferred document causality forest according to some example embodiments;

FIG. 12 illustrates an example method for constructing an inferred channel causality graph according to some example embodiments; and FIGS. 13A-13E illustrate example methods for constructing an inferred document causality forest and constructing an inferred channel causality graph according to some example embodiments.

DETAILED DESCRIPTION

Some non-limiting, example embodiments will be described more fully hereinafter with reference to the accompanying drawings, in which some, but not all, example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Following from the background above, according to some non-limiting, example embodiments, methods and apparatuses are provided that analyze the characteristics of documents shared across channels (e.g., media channels) of a network to determine sources and associated relational forests to describe the spread of content from the source to various points. As provided herein a "document" may be an instance of content that is coupled with other data, possibly in the form of metadata, including a timestamp and, in some instances, a channel through which the document is distributed. In this regard, the term "document" is used herein to represent any item of input data treated as a unit. In general, the document need not necessarily be text nor a representation of human communication, nor does a document need to be of any particular size. For example, a document may be a piece of computer code binary or source code, representing a single subroutine, a collection of routines, a module, or an entire program.

According to various example embodiments, documents may be collected, possibly in real time, and similarity analyses may be performed to determine which of the documents have content with a threshold similarity relationship. Those documents that are sufficiently similar in content may then be temporally analyzed via timestamps, to determine an earliest document that was published to a network, such as the Internet, and a flow of similar documents with respect to time based on the timestamps. Based on the similarities of the document documents and the timestamps, causal edges within a relational tree may be defined to generate a useful structure for describing the relationships between the documents. Each causal edge of the tree or forest may be defined by two documents that have a highest content similarity, where the document with the earlier timestamp is considered the antecedent or prior document and the document with the later timestamp may be considered the subsequent or later document. Via the analysis of the documents, subsequent documents of a first causal edge may be antecedent documents in a second causal edge. As such, the connections formed between the causal edges involving the same or similar content may define a tree, and a number of such trees may define a forest for particular content, for example a story, that is being analyzed. Accordingly, the resultant relational structure may define an inferred document causality forest.

Such an inferred document causality forest may be leveraged to determine a variety of information about particular content or a story. For example, an origin of the story may be determined based on the inferred document causality forest. Additionally, a time-based flow and spread of the associated content can be determined based on the causal edges that define the inferred document causality forest. Further, in some example embodiments, a channel through which the document and associated content was distributed may be known, and the channel information may be included as an attribute of the inferred document causality forest. The term "channel" may refer to an indication of document source, such as an author, publication, web site, or presentation venue, but it could also serve to represent any other categorization of documents. As a result, the role and influence of the channels can also be ascertained. Further, according to some example embodiments, a channel-based relational structure may be defined based on the inferred document causality forest, which may be referred to as an inferred channel causality graph. The term "graph" is used to refer to a mathematical structure, a computer science structure, or the equivalent information represented in any convenient way and is therefore non-limiting when used without further descriptive terms. In particular, "building a graph" may involve the accumulation and organization of the information to construct the graph. Such as graph can be developed as a tree or flow structure to identify the channels through which certain content was spread and to what degree. According to some example embodiments, an influence metric may also be defined that has a value based on, for example, a number of similar documents that were shared downstream from the channel. As such, an influence of the channel, at least with respect to selected content, may be defined.

Accordingly, some example embodiments may provide a technical platform to analyze documents to determine the provenance and spread of information and more importantly, in some instances, the provenance and spread of misinformation. Some example embodiments may provide answers to questions including: Who first said it? Who got the story from whom? How widely did a message spread, and to what quarters? Looking across many such stories, are there patterns of spreading? Are there super spreaders? Are there obvious points for early observation and possible intervention? Example embodiments described herein provide technical solutions to these and other technical problems that provide answers to these questions with respect to the creation and propagation of documents on a network.

Based on the foregoing and the description of the example embodiments provided herein, it can be seen that a technical solution has been developed in response to the technical problem of the unknown source and spread of documents within a networked environment. The solution, which is rooted in computer technology, is implemented as a practical application that proves valuable at least in the context of determining the source and spread of potentially threating content for use in investigations prior to, during, or after an event. As such, the example embodiments provided herein provide a practical application in the context of cybersecurity applications. Further, via analysis of the channels, an assessment of the individuals or organizations that spread and distribute select content can be revealed and possible predictions of future influence with respect to the same or other content can be understood. As mentioned above, example embodiments may be implemented with respect to computer-based and network information spreading between servers and other networked devices, and therefore the subject matter is rooted in computer technology. Having described some aspects of some example embodiments at a relatively high-level, the following provides a more in-depth description of example embodiments.

According to various example embodiments, a set of documents may be obtained by an apparatus including processing circuitry, and the processing circuitry may be configured to implement various example methods described herein. The set of documents, according to various example embodiments, may be meant to encompass those documents relevant to a question of (mis)information spread for topics or domains of interest. Each document may include content, a "channel" (such a domain name, source, news outlet, or publication), and a timestamp of publication. In practice, documents may be received at once, via streaming, or may be a combination of the two. As an example provided merely for means of explanation, the content may be human discourse in the form of text. However, it would be understood by one of ordinary skill in the art that the example methods described herein may be applicable to different and/or more general information such as computer binaries and other forms of human communication.

It can be assumed that much of propagating (mis)information from a source document may be accomplished by taking large (perhaps mostly unattributed) quotes from the source document. Conversely, two documents whose contents share many long substrings are likely to draw from a common source document (perhaps one of the two documents). Moreover, if a document is derived from one of a set of candidate source documents, the most likely source document may be the one which is the most similar to the derived document. According to some example embodiments, these principles can be considered in the construction and implementation of various example embodiments.

In consideration of the foregoing, generalized steps of some example embodiments will now be described in the context of a computerized implementation of an information flow analysis. The operations described herein may be performed sequentially, or where possible, in parallel by the processing circuitry implementing the solution. As such, initially, each document within a received document set may be compared to each other document for similarity of content. Based on the similarities, a document similarity graph may be produced. Each node within the document similarity graph may represent a document, and each edge connects two nodes whose document similarity exceeds a specified similarity threshold. According to various example embodiments, the similarity score between the member documents of the edge may be vested in or associated with the edge. The nodes may carry information about the document that the nodes represent, namely the content, the channel, and the publication timestamp. Note that documents that are not similar to any other document need not appear in the graph or may appear in a separated, unrelated status. According to various example embodiments, the edges of the similarly graph need not be directional.

According to various example embodiments, based on the document similarity graph and the attributes of the graph's nodes and edges, an IDCF may be constructed. The IDCF may be a graph where each node is a node in the similarity graph, and an edge (referred to as a causal edge) from A to B may indicate that the most likely derivation of B's document is A's document. In this case, A may be considered the most likely antecedent of B, and the channel of A and the channel of B "shared" a document. As such, the causal edges of the IDCF, according to various example embodiments, may be directional. Each component of the IDCF describes a "story" and indicates a likely propagation for that story.

Further, an inferred channel causality graph (ICCG) may be determined from the IDCF by making a node for every channel in the IDCF, and adding a tie to the ICCG for every causal edge in the IDCF, going from the channel of the from-node in the IDCF to the channel of the to-node in the IDCF. Channel edges in the ICCG may represent multiple ties. Stated another way, a channel edge in the ICCG between C and D indicates sharing of documents between those sources, with the channel edge containing a tie for each such sharing, and the direction of the tie indicating the direction of sharing. The channel causality graph may summarize the patterns of provenance trajectories of stories of interest.

Further detail is now provided with respect to the ways in which a document similarity graph may be constructed according to various example embodiments. In this regard, any number of techniques may be used for comparing content, in this case for example text, for similarity. According to various example embodiments, an example comparison method is provided that confers language independence, fits well with the fundamental assumptions of shared documents, and has performed well in experiments. In this regard, an n-gram-based comparison approach may be used, such as one or more of those described in: U.S. Pat. No. 9,111,095 entitled APPARATUS AND METHOD FOR IDENTIFYING SIMILARITY VIA DYNAMIC DECIMATION OF TOKEN SEQUENCE N-GRAMS and issued Aug. 18, 2015; U.S. Pat. No. 9,910,985 also entitled APPARATUS AND METHOD FOR IDENTIFYING SIMILARITY VIA DYNAMIC DECIMATION OF TOKEN SEQUENCE N-GRAMS and issued Mar. 6, 2018; and U.S. Pat. No. 9,003,529 entitled APPARATUS AND METHOD FOR IDENTIFYING RELATED CODE VARIANTS IN BINARIES and issued Apr. 7, 2015 all of which are hereby incorporated by reference in their entireties. Alternative example embodiments may use different comparison methods.

In one example embodiment, an n-gram may be an n-long sequence of adjacent tokens, where tokens, for example, are characters or bytes. Not only do n-grams capture information about words, but also phrases, since n-grams can span multiple words, treating the intervening space as a letter. Shared n-grams across documents have been used to detect common language (for n near 3), common topic (for n near 5 or 6), and common author (for n near 10). Detection of plagiarism or code re-use can be had for larger values of n.

According to various example embodiments, an example method of comparing all documents against all others as provided herein records a subset of n-grams for each document, keeping, for example, information regarding the presence of each such n-gram being present, while ignoring or eliminating information regarding the number of times that each n-gram occurred and the location of those occurrences. Thus, according to various example embodiments, a document may be represented by a set of n-grams. The ensuing natural similarity score between two documents may be the Jaccard index of their n-gram sets, that is, if one set is W and the other is Z, then the similarity score is $(|W \cap Z|)/(|W \cup Z|)$, a value between 0 and 1, inclusive. Knowing the threshold of interesting scores, the fundamentally-quadratic comparison of every document with every other document can be accelerated considerably (i.e., embodying a computational improvement) so that most work is linear, making such comparisons practical for computing. A secondary similarity may be an inclusion score, given by $(|W \cap Z|)/("min" (|W|, |Z|))$, also producing a value in [0,1], and indicating how much of the smaller document is in the larger one. Also, comparison based on character n-grams or on byte n-grams can be agnostic to language and can work for any language or mixture of languages without the need for modification.

As such, generation of a similarly graph may be implemented by processing circuitry by reading documents and producing the similarity graph using a similarity assessment, with nodes representing the documents, and edges indicating similarity exceeding a specified similarity threshold. As mentioned above, the edges may carry the value of the similarity (both Jaccard and inclusion). Additional attributes of the documents, if present, may be included as attributes in the nodes. In particular, the channel, as described herein, and timestamp of each document may be preserved for subsequent analysis.

While the character/byte n-gram comparison method described above provides one example comparison technique that may be used for its simplicity and robustness, any other document similarity approaches can be substituted, particularly ones tailored to the nature of the content of the documents.

Further, matches between documents from the same channels may be treated specially within the graph. Retaining such documents provides a more accurate picture of a story's evolution but invites connections based on uninformative boilerplate often found in documents, and can therefore lead to producing many unnecessary graph edges, and stories that only involve one source, which might be of no interest. Omitting such documents can also break a single story into multiple components and give a less accurate picture of story evolution. A compromise, according to some example embodiments, may be to keep only those same-channel document matches above a higher similarity threshold, and to later omit components having only one source from the graph. Further description of constructing the similarity graph for multiple corpora is provided in further detail below.

Now with respect to the IDCF, the IDCF may be constructed based on the document similarly graph. By the assumptions stated earlier, if a document B is derived from a document A in the obtained collection, the document A can be found by examining those documents linked to B in the similarity graph that were published prior to B of which the candidate with the strongest similarity is document A. If such a pair is found, nodes representing documents A and B may be added to the IDCF, together with a causal edge from A to B, indicating that B derives from A. To construct the IDCF, every document B within the similarity graph is considered as a node for a causal edge. Following from the mention above, if equal-channel matches have been omitted from the similarity graph, then the IDCF will lack them also. It may happen that documents have equal timestamps. In such cases, the tie is resolved in a consistent manner, declaring one as earlier than the other.

According to various example embodiments, the IDCF can have no cycles, since a link A→B is added only if B is published after A. As such, the IDCF is indeed a forest, that is, each component is a tree. Moreover, the IDCF is a directed forest where the root may be the earliest document. Further, the work to construct the IDCF may be proportional to the number of edges in the similarity graph. Further, the inferred document causality forest provides a useful and worthy product and the result of the similarity and provenance analysis, since it describes how each story propagated and can determine a source or origin.

Based on the IDCF, according to various example embodiments, an ICCG may be generated, which may summarize the information flow among channels. In this regard, for each causal edge A→B in the IDCF, a tie may be added to the ICCG going from the channel of document A to the channel of document B. If there is consistent copying of channel A by channel B, many ties may go from A to B. In the event that copying goes both ways, the causal edge between them will be bidirectional. The work to construct the ICCG is proportional to the number of causal edges in the IDCF.

One use of the ICCG is to identify patterns in the document flow. Accordingly, it is likely that removal of causal edges representing fewer than k ties (document sharings), for some number k, will produce a graph that preserves the salient features, while removing distracting clutter. Such a simplified version is used for figures and descriptions provided below, but not for computations of metrics.

Having provided some depth of explanation as to the construction of the document similarly graph, the IDCF, and the ICCG, further in-depth explanation is now provided in the context of some example implementations. Accordingly, an explanation of constructing the document is now provided while comparing two different document corpora.

In the descriptions given above, a single collection of documents is considered. However, many applications may benefit from having two collections, say R (for "reference") and U (for "unknown"). The sets R and U may or may not have intersecting membership. In this situation, the documents of R may be recorded in data structures, then the unknowns from U may be passed or compared against those structures, recording the significant similarities (e.g., similarity scores) between documents in R and documents in U. One such situation arises when one has a set of reference documents that is static (or which slowly evolves) being compared with a streaming source considered the unknowns. The situation may also occur with both corpora being streams. The data structures are designed to afford rapid lookup of document features for comparison. According to some example embodiments, they may include, in part, of hash tables, so that each feature of an unknown document can be used as a key in those hash tables to obtain a list of all reference documents that share that feature. Further according to some embodiments, those features may be n-grams or hashes of n-grams of document bytes or characters.

The similarity graph may be generated to find matches of documents drawn from different corpora, that is, to only note matches of a document from R with a document from U. It may be desirable to describe the entire flow of any stories that involve both corpora, without the need to compare every document in R with every other document in R and every document in U with every other document in U. Indeed, if those internal comparisons were to be performed, then R and U could simply be combined into one collection and process the combined collection as described above.

In this regard, let the similarity score between documents r and u be denoted $S(r, u)$, and T be a similarity threshold. Similarity scores above T will be considered sufficiently similar, according to some example embodiments. The method may capture all matches between these two corpora, plus any matches within R and within U that inform the flow of stories involving those matches. For any document sets X and Y, let $M_{XY}(T)=\{(x, y)|x \in X, y \in Y, S(x, y) \geq T\}$ be the set of matches between them. By comparing all of the documents in R against all of the documents in U, $M_{RU}(T)=\{(r, u)|r \in R, u \in U, S(r,u) \geq T\}$ may be obtained. All the matches within R and within U that pertain to these matches may be found. Accordingly, let $R_M(T)=\{r \in R|\exists u \in U \ni (r, u) \in M_{RU}(T)\}$ and $U_M(T)=\{u \in U|\exists r \in R \ni (r, u) \in M_{RU}(T)\}$. Going "one hop" further than $M_{RU}(T)$, $M_{RR_M}(T)$ and $M_{UU_M}(T)$ may be determined. Moreover, a chain out into R and U may be performed as far as possible to analyze the sources and destinations of stories, to the extent that the data permits. In fact, doing so may connect stories that appear separate at the outset.

FIG. 1 provides an illustration in which documents 105a-105f are shown within graph nodes including a reference grouping 102 for a set of documents R and an unknown grouping 104 for a set of documents U. In the illustrated example, the underlying story tree is indicated by edges having solid lines (links 110a-110e); it is this tree whose discovery is sought.

Via a comparison of documents in U with those in R, a determination has been made that link (B,D) 106, link (C,D) 110c, and link (C,E) 108 are sufficiently similar (e.g., at least a threshold similarity). According to some example embodiments, an approach may be implemented to avoid comparing all documents to each other to determine the causal edges of a relationship tree. In other words, according to various example embodiments, the tree can be determined without computing $M_{RR}(T)$ and $M_{UU}(T)$. As provided herein, various different approaches may be implemented, e.g., by processing circuitry, to do so with different expenses and constraints.

According to various example embodiments, in a first example implementation, one or more of the following may be implemented to augment an initial comparison of sets U 104 and R 102. For example, according to some embodiments, the link (B,C) 110b and the link (D,E) 110d can be discovered by testing for similarity among all pairs of discovered nodes $R_M(T) \cup U_M(T)$. Since documents B 105b, C 105c, D 105d, and E 105e had been surfaced by comparing U to R, a subsequent comparison among these can reveal the two other connections (e.g., links 110b and 110d). In the event that the original matching document set is much smaller than the combined corpora, such a secondary scoring approach be relatively inexpensive to implement.

According to another example embodiment, in a second example implementation, it is possible that documents A 105a and D 105 d are similar, but their similarity can be lower than the desired similarity threshold T The same may true for the document pair C 105c and F 105f As such, initial comparisons between sets U 104 and R 102 may be performed using threshold T'<T. In this manner, once the set of matching documents $R_M(T') \cup U_M(T')$ is discovered, the all matches among them may be found. Subsequently, the approach described above in the first example implementation may be performed.

In an example third implementation, corpus R 102 may be treated as being static or largely static and recorded in structures, while the documents of U 104 may be presented serially to be compared to members of R 102 (although in some example embodiments a parallel approach may be implemented). Any document u E U may be added that matches aspects in R to the set R 102, such that similarities between u and subsequent documents in U 104 can be noted. The link (E,F) 110e can be discovered if F 105f followed E 105e in the serial presentation. In the event that U 104 could be presented n times to the matching apparatus, documents within U 104 that are within n hops of documents in R 102 would also be discovered. Such would remain true even if U 104 evolved, as would be the case if, for example, older documents dropped off of the stream and new ones were added on each repetition, so that each document appeared n times before leaving the stream. Such a technique can be used to expand the story through the corpus U 104 without necessarily comparing every document in U 104 with every other document in U 104.

A fourth example implementation may be performed that is complementary to the third example implementation described above. Again, the corpus R 102 may be considered static or largely static and may be recorded in structures, while the documents of U 104 may be presented serially to be compared to members of R 102. That said, in some example embodiments, a parallel approach may be implemented. Upon discovering that u∈U matches r ∈R, r can be "added" to U 104, such that r can be tested against all documents in R 102 for matches, recording any that are observed. The approach can be applied recursively: if testing r against the remainder of R 102 identifies a match r', then r' can be tested for matches against the remainder of R 102, and so on. In some instances, this approach may be used at most once for each member of R 102, even if the approach of the third example implementation is applied as well.

In a fifth example implementation, a combination of the third example implementation and the fourth example implementation may be performed. In this regard, upon discovering that u∈U matches r∈R, u can be added to R 102 and r can be added to U 104 recursively, provided that r has not yet been added to U 104. Again, repeatedly presenting U 104 to the apparatus may be needed to gain the full story. According to various example embodiments, this combination obviates the first example implementation and removes much, but not all, of the motivation for the second example implementation.

Following from the implementations described above, approaches for handling streaming inputs may also be considered. The following provides some example implementations that can be used in a streaming environment, distinguishing between burst streaming and continuous streaming. With respect to burst streaming, a finite set (a burst) of documents may be streamed through the apparatus. The same, or an evolving, burst may be sent through the same apparatus after an interval, with the process repeated ad infinitum. In the continuous case, the stream never stops.

In a bursting case, there may be, for example, only one burst, but streaming may be necessitated by the inability to hold all data in memory. As described above, there is merit to repeating the same burst to build out a full similarity graph. In another situation, the burst may evolve, with part of the burst being previous burst, and part being new data that has been collected since the last burst. This permits evolution to keep up with newly-posted data while offering a chance to build out the similarity graph. Bursting offers natural opportunities to perform the remainder of the processing, namely, during the intervals between bursts.

In example embodiments involving continuous streaming, there is no expectation that the same data will be repeated, and a snapshot of the similarity graph may be captured at any convenient time to perform the other steps of processing. However, if the processing can accommodate data at a rate faster than the continuous stream, the continuous stream can be turned into a periodic bursting stream by holding the last m stream documents in a buffer and presenting that buffer as a burst, then age off some of the buffer while adding new documents, then present the updated buffer as a burst, and so on.

Also in each case of streaming, snapshots of the preliminary similarity graph may be taken between bursts (for a bursting stream) or at convenient intervals (for a continuous stream) to construct a final similarity graph (which may include augmentation), which may then be used to construct the other graphs. Such approaches can be used as the graph evolves to monitor the flows in a near real-time manner.

Alternatively, the matching can be run for some number of bursts or a fixed time, then the remaining steps applied to obtain the graphs.

When considering a streaming approach against the same stream, a stream U can be received, and constructed stories may be determined from documents of the stream. The subject may be narrowed by filtering to restrict attention to those stories having at least one document that possesses specified attributes. The filter may be referred to as K. If no filtering is desired, K may a trivial or a filter that admits all documents. Examples of filters include those that pass documents containing specified keywords or those that come from specified channels. Filtering can be done on any aspect of a document's content or metadata.

In this regard, initially, the set R may be empty. Each document u from U may be examined in turn. If a match is found in R at the threshold T, that match may be recorded and u may be added to R. Otherwise, if u passes filter K, then u may be added to R. In this way, the matches can constitute stories that involve at least one document passing the filter and matching documents are presented to the remainder of the stream to continue extending story discovery. Accordingly, this approach incorporates the augmentation that is the third example implementation described above.

According to various example embodiments, example procedures for obviating a similarity graph are described. In this regard, a process may turn from observing document matches to constructing the IDCF, without the need to construct the intermediate similarity graph. Indeed, according to various example embodiments, the IDCF may be constructed incrementally as matches are observed, and updated with each match.

As the matching process proceeds, for any document d, $M_d$ may be the document's most likely antecedent, if one has been identified. At any time, the ICDF may be the graph whose vertices V are the documents that have matched and whose (directed) causal edges are $\{(M_d, d) | d \in V \text{ and } M_d \text{ exists}\}$. In this regard, if documents a and b match, then documents a and b may be vertices of the ICDF. For this discussion, without loss of generality, the timestamp of a may be assumed to precede that of b, ignoring the possibility that the documents have identical timestamps. If $M_b$ does not yet exist or if $S(a, b) > S(M_b, b)$, set $M_b \leftarrow a$. In this way, the ICDF may be constructed and continually updated, for example, without the need for the intermediate similarity graph. By bypassing the similarity graph, considerable space may be saved by not retaining the many candidate causal edges for possible document flow, keeping, for example, only one that is currently the best candidate.

Example scenarios will now be described with a first example being associated with potentially questionable news sites. In this regard, an example is provided that is associated with monitoring RSS (really simple syndication) feeds of nominal news sites regarded as questionable sources by MediaBiasFactCheck.com. In their words, "A questionable source exhibits one or more of the following: extreme bias, consistent promotion of propaganda/conspiracies, poor or no sourcing to credible information, a complete lack of transparency and/or is fake news. Fake News is the deliberate attempt to publish hoaxes and/or disinformation for the purpose of profit or influence." The RSS posts of approximately 280 such sites were collected over January to March 2021, amounting to approximately 110,000 documents.

A document similarity graph was constructed by inventorying 20-grams (e.g., a n-gram with n=20) for each document and thresholding on a Jaccard similarity of 20%, producing 6,400 components involving 15,000 document nodes connected by 11,000 links. Comparison among all of the 110,000 documents took less than 2 minutes to perform, including constructing the similarity graph. Each of the graph components represents a "story".

One component 200 of the similarity graph is illustrated in FIG. 2, representing 5 posts from 4 sites and describing a single story. The links, identified by asterisks (*), carry the similarity scores and are labeled with them. Using these, and the posting times of the documents (indicated below the nodes), the inferred document causality forest can be constructed for the entire similarity graph that shows one "story". Nodes have internal labels showing the beginning of the content and labels showing the channel (news site URL) and posting date-time. Accordingly, FIG. 3 shows the inferred document causality tree 300 for the component shown in FIG. 2.

Another, more complex example, is illustrated in FIG. 4, showing another component 400 of the inferred document causality forest for the 110,000 documents from questionable news sites. This component is related to the false story that voting machines had been rigged to favor one party in the 2020 U.S. presidential election. Nodes have internal patterns representative of the channel (news site URL) and thickness of the links being provided by similarity score (i.e., thicker indicating higher similarity).

With the IDCF constructed, the ICCG can also be constructed, from which patterns of stories being shared may be indicated. Here, the ICCG is rather cluttered if every channel edge is shown. However, recurring patterns may be identified and uninteresting clutter removed, by omitting channel edges having a small number of shared documents (i.e., less than a threshold number, for example 20 or fewer shared documents). Accordingly, FIG. 5 shows an ICCG 500, less channel edges representing 20 or fewer shared documents for this example. The arrows are sized by relative flow direction of numbers of shared documents.

FIG. 6 shows a detailed portion 600 of FIG. 5 and the clear patterns that are revealed. Note that copying between "DavidHarrisJr" and "djhjmedia" happens in both directions in approximately equal measure (as indicated by the opposing, same-sized arrows), while the others are more one-sided (as indicated by larger arrows in one direction of a link). As mentioned above, the flow is bidirectional, and arrow size indicates relative flow direction.

Aspects of influence measures and associated roles to be leveraged in example embodiments will now be described. The ICCG provides a great deal of insights about the recurring paths of information travel, but hides the details of how each story flowed. The more detailed IDCF describes each story's evolution and each channel's role in that evolution, but may not be effective at providing insights on how each channel acts on the whole. As such, the roles that each channel serves on average can be characterized through consultation of the two graphs. For example, for each channel, determinations can be made regarding whether the channel's documents are original or copied from others, whether the channel is widely copied and how often, and how many different sources/sites copy the channel's documents. To make these determinations, related measures on the ICCG and IDCF can be defined, and such measures can illuminate the roles of channels in their information ecosystems.

For example, a replication influence score can be defined for a channel. The replication influence score of, for example, channel C, may measure how many documents by others are derived from documents of C. The replication influence score may be determined by summing contributions from each tree in the IDCF, possibly normalizing by dividing by the number of non-C nodes in the forest. An example tree 700 shown as an inferred document causality tree from such a process is shown in FIG. 7. Here, thegatewaypundit.com receives a contribution of 4, as does thespectator.info. The channels teaparty.org and lucianne.com get no contribution. (These values may be summed and normalized.) A normalized value of 1 would mean that all postings in the data came from that channel.

Additionally, a rooted replication influence score may be determined. The rooted replication influence score may be similar to the replication influence score, but a channel only receives a contribution if the channel is the root of the tree. As such, the rooted replication influence score measures the number of copies the channel's original documents engender. In the example tree 700, thegatewaypundit.com is the root, and receives a contribution of 4, while no other channel gets a contribution from this example tree 700. Again, the sum across all trees may be normalized by the number of posts by others.

Additionally, a root count influence score may be determined. The root count influence score may be the fraction of times that a channel's document is the root of a tree in the IDCF. A value of 1 means that the channel is always the source of the stories within the data, and a value of zero means that the channel's documents always originated from another channel within the data.

An originality score may also be determined. Considering the documents by channel C that engendered a copy, the originality score may be the fraction that were originated by C. The originality score may consider every document that was copied, no matter where the document is in an inferred document causality tree, so long as it has a child, that is, so long as it was copied. The originality score is therefore a measure of how often the channel is making new content that is deemed worthy of copying.

Finally, an average penetration influence score may be determined. The penetration influence score for channel C may be an average, over all documents p by C, of the fraction of other channels that derived a document from p.

In another example, documents associated with a number of China-based new sites were analyzed. The example implementation involved two sources of data in the form of RSS postings of three Chinese news sites and all documents from a complete LEXISNEXIS® feed, both collected over a 24-hour period. The RSS postings were accumulated by polling the RSS feeds of China Daily, People's Daily, and China News every hour. In this example, at intervals of one hour, a last one million documents from the LEXISNEXIS® feed were streamed and compared to the accumulated RSS documents which entailed considerable overlap as there are only a few million new documents per day.

A document similarity graph was constructed by inventorying 20-grams for each document and thresholding on a Jaccard similarity of 20%. The resulting similarity graph contained 402 documents from the RSS feeds and 10,707 matching documents found in the LEXISNEXIS® feed. In this instance, duplicate documents and matches were not recorded. All of the documents were in Chinese text, although, in this example implementation, no assumption or accommodation of language was made to adapt the method to Chinese text. Accordingly, if the documents had had a mixture of languages, the result would have been the same. The inferred document causality forest contained 909 stories.

Additionally, the inferred channel causality graph was also generated which was trimmed of causal edges representing 10 or fewer documents. The nodes were sized by replication influence scores. Note that while the data was biased by matching documents from China Daily, People's Daily, and China News, only one of those three seeds (People's Daily or people.com.cn) had a high influence score, and even that one had a lower replication influence that Sohu.com and SINA. Indeed, it was determined that People's Daily copies frequently from Sohu.com. It was also interesting to note that while SINA had a higher replication influence than People's Daily, People's Daily had a higher root count influence and root replication count influence, meaning that People's Daily gains a larger fraction of its influence from original stories. In this regards, originality may be determined by the data available, and the stories may be copied from sources not in the data corpus. Additionally, it is noted that the data in this example was limited to 24 hours of collection and only matches against documents retrieved by RSS from the three seed sites and LEXISNEXIS®, which may omit prolific and influential press sources.

Having provided a description of some example implementations, it is shown that the methodology may operate to trace the evolution and provenance of stories and clearly surfaces patterns of information flow, thereby providing never before seen relationships between the data and the spread of data. The practicality of applying an implementation of example embodiments to real-world problems rests on the ability to recognize similarity (and especially dissimilarity) rapidly at scale. The example embodiments employed in the experiments here, based on long character/byte n-grams for similarity analysis, as mentioned above, are also described: in U.S. Pat. No. 9,111,095 entitled APPARATUS AND METHOD FOR IDENTIFYING SIMILARITY VIA DYNAMIC DECIMATION OF TOKEN SEQUENCE N-GRAMS and issued Aug. 18, 2015; U.S. Pat. No. 9,910,985 entitled APPARATUS AND METHOD FOR IDENTIFYING SIMILARITY VIA DYNAMIC DECIMATION OF TOKEN SEQUENCE N-GRAMS and issued Mar. 6, 2018; and U.S. Pat. No. 9,003,529 entitled APPARATUS AND METHOD FOR IDENTIFYING RELATED CODE VARIANTS IN BINARIES and issued on Apr. 7, 2015, all of which are hereby incorporated by reference in their entireties. In additional example embodiments, other similarity measures could alternatively be used, such as those based on word n-grams, word co-occurrences, concept co-occurrences, latent terms, concept n-grams, and so on.

According to some example embodiments, determinations may be made under the assumption that all relevant data is included in the corpus, which permits the ability to claim provenance. If stories are continually identified in channel B whose most likely antecedent is found in channel A, then either B is copying A or A is quicker to copy than B from a hidden source. These two cases may be indistinguishable without the completeness assumption. But even without the assumption, the observed patterns would still be valid observations and inform an understanding of the information ecosystem and the flow of information through the system.

As described herein, according to various example embodiments "reference" documents may be identified as static or slowly-evolving structures designed to make rapid comparison, and "unknown" data may be addressed by processing a queue of those documents. Here "queue" may refer to any method of presenting documents one at a time for processing. As such, additional documents may be arranged in line for examination, either at the end of the queue for processing after all other occupants of the queue have been examined, or on the front of the queue for processing before current occupants. According to various example embodiments, comparisons may be performed in a parallel manner, working from multiple queues, which may be derived from a single corpus or multiple corpora.

Further, example embodiments as described herein may be applicable in a number of different contexts. In this regard, while some example embodiments operate to examine the flow of misinformation, implementation may be much more broadly applicable to, for example, the dissemination of any sort of messaging, whether legitimate or not, whether accidental or carefully considered, and whether friendly, neutral, or intended to cause harm.

Based on the foregoing and as further described herein, example embodiments may be implemented in context of processing circuitry configured to execute the described functionalities. Now referring to FIG. 8, an example configuration of an apparatus 800 with processing circuitry 810 configured to perform the functionalities described herein is shown. Processing circuitry 810 may, in turn, include a processor 814, a memory 812, and a communications interface 840. Additionally, the apparatus 800 may include additional components not shown in FIG. 8 and the processing circuitry 810 may be operably coupled to other components of the apparatus 800 that are not shown in FIG. 8.

Further, according to some example embodiments, processing circuitry 810 may include and be in operative communication with or embody, the memory 812, the processor 814, and the communications interface 840. Through configuration and operation of the memory 812, the processor 814, and the communications interface 840, the processing circuitry 810 may be configurable to perform various operations as described herein, including the operations and functionalities described with respect to the example embodiments as described herein. In this regard, the processing circuitry 810 may be configured to perform computational processing, memory management, user interface control and monitoring, document comparison, and graph construction, according to an example embodiment. In some embodiments, the processing circuitry 810 may be embodied as a chip or chip set. The processing circuitry 810 may include one or more physical packages (e.g., chips) including materials, components or wires on a structural assembly (e.g., a baseboard). The processing circuitry 810 may be configured to receive inputs (e.g., via peripheral components), perform actions based on the inputs, and generate outputs (e.g., for provision to peripheral components). In an example embodiment, the processing circuitry 810 may include one or more instances of a processor 814, associated circuitry, and memory 812. As such, the processing circuitry 810 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 812 may include one or more non-transitory memory devices such as, for example, volatile or non-volatile memory that may be either fixed or removable. The memory 812 may be configured to store information, data, documents, applications, instructions or the like for enabling, for example, the functionalities described with respect to the track the provenance of information. The memory 812 may operate to buffer instructions and data during operation of the processing circuitry 810 to support higher-level functionalities, and may also be configured to store instructions for execution by the processing circuitry 810. The memory 812 may also store various information including documents and collections of documents received in a variety of ways including via a stream provided by the communications interface 840. According to some example embodiments, various data stored in the memory 812 (e.g., graphs as described herein) may be generated based on other data (e.g., documents and the like) and stored or the data may be retrieved via the communications interface 840 and stored in the memory 812.

As mentioned above, the processing circuitry 810 may be embodied in a number of different ways. For example, the processing circuitry 810 may be embodied as various processing means such as one or more processors 814 that may be in the form of a microprocessor or other processing element, a coprocessor, a controller or various other computing or processing devices including integrated circuits such as, for example, an application-specific integrated circuit (ASIC), a field-programmable gate array (FPGA), or the like. In an example embodiment, the processing circuitry 810 may be configured to execute instructions stored in the memory 812 or otherwise accessible to the processing circuitry 810. As such, whether configured by hardware or by a combination of hardware and software, the processing circuitry 810 may represent an entity (e.g., physically embodied in circuitry—in the form of processing circuitry 810) capable of performing operations according to example embodiments while configured accordingly. Thus, for example, when the processing circuitry 810 is embodied as an ASIC, FPGA, or the like, the processing circuitry 810 may be specifically configured hardware for conducting the operations described herein. Alternatively, as another example, when the processing circuitry 810 is embodied as an executor of software instructions, the instructions may specifically configure the processing circuitry 810 to perform the operations described herein.

The communications interface 840 may include one or more interface mechanisms for enabling communication with other devices external to the apparatus 800, via, for example, network 850, which may, for example, be a local area network, the Internet, or the like, through a direct (wired or wireless) communication link to another external device, or the like. In some cases, the communications interface 840 may be any means such as a device or circuitry embodied in either hardware, or a combination of hardware and software that is configured to receive or transmit data from/to devices in communication with the processing circuitry 810. The communications interface 840 may be a wired or wireless interface and may support various communications protocols (WIFI®, BLUETOOTH®, cellular, or the like). As described herein, the communications interface 840 may be specifically configured to access and retrieve data streams, possibly in real time, including documents that may be published by various channels to performed continuous similarity analyses and updated graph constructions. For example, via connection to the network 850 and the communications interface 840, the processing circuitry 810 may be configured to retrieve and store documents or streams of documents from channels, such as, for example, channel A 854 and channel B 856.

According to some example embodiments, the processing circuitry 810 may also be configured to control a user interface including, for example, a display. According to some example embodiments, the user interface may be configured to output representations of the results of the implemented functionalities described herein, for example, on a display for consideration by a user. In this regard, for example, an inferred document causality forest or an inferred channel causality graph may presented via the display.

In view of the foregoing, the processing circuitry 810 may be configured, with the communications interface 840, to collect documents and perform provenance-related functionalities on the collections of documents. In this regard, the processing circuitry 810 may be configured perform the example methods and combinations of the example methods described with respect to the following flowcharts as provided in FIGS. 9A to 13E.

In this regard, with respect to generating an IDCF, the processing circuitry 810 may be configured to perform the example method as provided in the flowchart 900 of FIG. 9A. The constructed inferred document causality forest may provide a variety of useful outputs including indications of the flow of information in documents.

The example method may include, at 905, determining a similarity threshold T. The determination of the similarity threshold be may be made in a number of different ways. For example, a similarity analysis may be performed on a representative set of documents to determine the fraction of documents that satisfy the threshold or may be based on experience on what typically constitutes genuine provenance. The threshold may be adjusted to achieve an acceptable compromise between maximizing the recognition of relevant matches and minimizing non-relevant matches. Additionally, at 910, the example method may include receiving a plurality of documents R (e.g., reference documents), where each document of the plurality of documents R includes content and includes or is associated with a timestamp, and possibly a channel. At 915, the example method may include receiving a plurality of documents U (e.g., unknown documents), where each document of the plurality of documents U includes content and includes or is associated with a timestamp, and possibly a channel. Further, at 920, the example method may include constructing data structures Z to represent each document of the plurality of documents R, for example, for purposes of rapid comparison. Additionally, at 925, the example method may include constructing a queue Q of documents for comparison using serial or parallel approaches. The queue Q may be initialized with documents in the plurality of documents U. Further, for each document A of the queue Q, the example method may include, at 930, determining a similarity (e.g., similarity score) to each document B of the data structures.

To determine the similarity to each document B at 930, an example sub-method illustrated in flowchart 950 of FIG. 9B may be performed for each document A of the queue Q. In this regard, at 955, the example method may include selecting a document A from the queue Q, and, at 960, selecting a set of documents H (e.g., feasible documents) for evaluation with document A from the data structures Z. Thereafter, for each document B of the set of documents H, a comparison of the content of document A with the content of document B may be performed, at 965, to produce a respective similarity score S(A,B). At 970, if the similarity score S(A,B) exceeds the threshold T, then the similarity score S(A,B) may be recorded and/or stored (e.g., in the memory 812).

Returning to the example method of flowchart 900, the example method may continue with the construction of an inferred document causality forest at 935. Again, to construct the inferred document causality forest, an example sub-method illustrated in flowchart 980 of FIG. 9C may be performed by the processing circuitry 810. In this regard, construction of the inferred document causality forest, in accordance with the example method may include initializing an inferred document causality forest as an empty graph at 982. Additionally, for each document D having a stored or recorded similarity score, the example method may include evaluating a set F of stored similarities involving document D at 984. At 986, if the set F of recorded or stored similarities includes a document with a timestamp that predates the timestamp of document D, then perform operations 988, 990, and 992.

At 988, the example method may include examining a subset G of the recorded similarities of the set F that include a document with a timestamp that predates the timestamp of document D, and, at 990, selecting a most likely (e.g., highest probability) antecedent document M by selecting the document appearing in subset G of recorded similarities have a largest similarity (e.g., largest similarity score). At 992, a causal edge of the inferred document causality forest may be added from a node representing document M to a node representing document D. As mentioned above, to construct the inferred document causality forest, this example sub-method may be repeated for each document D having a similarity that exceeds the threshold T.

According to some example embodiments, the example method of flowcharts 900, 950, and 980 may be modified in a variety of ways according to some example embodiments. For example, according to some example embodiments, the selection of the set of documents H for evaluation with document A may include selecting all documents except document A for the set of documents H. Further, according to some example embodiments, selecting the set of documents H for evaluation with document A may include excluding document A and documents that do not or are unlikely to have a similarity score exceeding the threshold T. According to some example embodiments, each document may also be associated with a channel, and the selection of the set of documents H may include excluding documents having the same channel as document A.

Further, according to some example embodiments, comparing the content of document A with the content of document B may include comparing n-grams of the content of document A with n-grams of the content of document B. Additionally, according to some example embodiments, comparing the content of document A with the content of document B may be based on a Jaccard similarity of the sets of n-grams selectively drawn from documents A and B. Further, selection of the set of documents H for evaluation with document A may be based on bounds of the Jaccard similarity from estimates of document n-gram set sizes. According to some example embodiments, the plurality of documents R may be the same as the plurality of documents U. According to some example embodiments, storing or recording the similarity score S(A,B) may include, if document A has not been added to the data structures Z, add document A to the data structures Z. According to some example embodiments, storing or recording the similarity score S(A,B) may include adding B to the beginning of the queue Q. According to some example embodiments, construction of the queue Q of documents for comparison may include constructing the queue Q of documents for comparison by initializing the queue Q with documents within the plurality of documents U, said documents being placed in the queue Q multiple times. In this regard, a using serial or parallel comparison approach may be implemented.

According to some example embodiments, some or all of the above operations may be combined or substituted. For example, according to some example embodiments, a combination may be performed such that storing or recording the similarity score S(A,B) includes the following. Adding document B to the beginning of the queue Q, if document A has not been added to the data structures Z, then adding document A to the data structures Z, and constructing the queue Q of documents for comparison by initializing the queue Q with documents within the plurality of documents U, said documents being placed in the queue Q multiple times.

Now referring to FIGS. 10A, 10B, and 10C, another example embodiment of a method, that processing circuitry 810 may be configured to implement, is provided and illustrated in the flowcharts 1000, 1050, and 1090. In this regard, the processing circuitry 810 may be configured to generate an inferred document causality forest for determining story flow and the like as described herein.

The example method may include, at 1005, determining a similarity threshold T. Additionally, at 1010, the example method may include receiving a plurality of documents R (e.g., reference documents), where each document of the plurality of documents R includes content and includes or is associated with a timestamp, and possibly a channel. At 1015, the example method may include receiving a plurality of documents U (e.g., unknown documents), where each document of the plurality of documents U includes content and includes or is associated with a timestamp, and possibly a channel. Further, at 1020, the example method may include constructing data structures Z to represent each document of the plurality of documents R, for example, for purposes of rapid comparison. Additionally, at 1025, the example method may include constructing a queue Q of documents for comparison, using serial or parallel approaches. The queue Q may be initialized with documents in the plurality of documents U. Further, for each document A of the queue Q, the example method may include, at 1030, compare the document A to each document B of the data structures Z to update an antecedent table that indicates a most likely (e.g., highest probability) antecedent document.

To update the antecedent table at 1030, an example sub-method illustrated in flowchart 1050 of FIG. 10B may be performed for each document A of the queue Q. In this regard, at 1055, the example method may include selecting a document A from the queue Q, and, at 1060, selecting a set of documents H (e.g., feasible documents) for evaluation with document A from the data structures Z. Thereafter, for each document B of the set of documents H, a comparison of the content of document A with the content of document B may be performed, at 1065, to produce a respective similarity score S(A,B). At 1070, if the similarity score S(A,B) exceeds the threshold T, then operations 1075 to 1085 may be performed.

In this regard, at 1075, the example method may include determining a document E, which is the document that has an earlier timestamp among document A and document B. Further, at 1080, a determination of document L may be made, which is the document that has the later timestamp among document A and document B. Finally, at 1085, if document L does not have a most likely antecedent M(L) stored or recorded, then the example method may include denoting and storing document E as the most likely antecedent M(L). Otherwise, if the similarity score S(A,B) exceeds the similarity score of S(M(L),L), then the example method includes denoting and storing document E as the most likely antecedent M(L).

Returning to the example method of flowchart 1000, the example method may continue with the construction of an inferred document causality forest at 1035. Again, to construct the inferred document causality forest, an example sub-method illustrated in flowchart 1090 of FIG. 10C may be performed. In this regard, construction of the inferred document causality forest may include initializing an inferred document causality forest as an empty graph at 1092. The example method may further include, for each document D having a stored or recorded most likely antecedent M(D), adding, at 1094, a causal edge in the inferred document causality forest from a node representing document M(D) to a node representing document D.

According to some example embodiments, the example method of flowcharts 1000, 1050, and 1090 may be modified in a variety of ways according to some example embodiments. For example, according to some example embodiments, the selection of the set of documents H for evaluation with document A may include selecting all documents except document A for the set of documents H. Further, according to some example embodiments, selecting the set of documents H for evaluation with document A may include excluding document A and documents that do not or are unlikely to have a similarity score exceeding the threshold T. According to some example embodiments, each document may also be associated with a channel, and the selection of the set of documents H may include excluding documents having the same channel as document A.

Further, according to some example embodiments, comparing the content of document A with the content of document B may include comparing n-grams of the content of document A with n-grams of the content of document B. Additionally, according to some example embodiments, comparing the content of document A with the content of document B may be based on a Jaccard similarity of the sets of n-grams selectively drawn from documents A and B. Further, selection of the set of documents H for evaluation with document A may be based on bounds of the Jaccard similarity from estimates of document n-gram set sizes. According to some example embodiments, the plurality of documents R be the same as the plurality of documents U. According to some example embodiments, the example method may include, if document A has not been added to the data structures Z, add document A to the data structures Z. According to some example embodiments, the example method may include adding B to the beginning of the queue Q. According to some example embodiments, construction of the queue Q of documents for comparison may include constructing the queue Q of documents for comparison by initializing the queue Q with documents within the plurality of documents U, said documents being placed in the queue Q multiple times.

According to some example embodiments, some or all of the above operations may be combined or substituted. For example, according to some example embodiments, a combination may be performed such that storing or recording the similarity score S(A,B) includes the following. Adding document B to the beginning of the queue Q, if document A has not been added to the data structures Z, then adding document A to the data structures Z, and constructing the queue Q of documents for comparison by initializing the queue Q with documents within the plurality of documents U, said documents being placed in the queue Q multiple times.

Now referring to FIGS. 11A, 11B, and 11C, another example embodiment of a method, that processing circuitry 810 may be configured to implement, is provided and illustrated in the flowcharts 1100, 1150, and 1170. In this regard, the processing circuitry 810 may be configured to generate an inferred document causality forest for determining story flow and the like as described herein. According to some example embodiments, the example methods as described with respect to flowcharts 1100, 1150, and 1170 may be performed with augmentation of the set of the documents under analysis as provided from a single stream without a similarity graph.

The example method may include, at 1105, determining a similarity threshold T. Additionally, at 1110, the example method may include implementing a filter F for selecting documents to include in a set of documents for analysis. At 1115, the example method may include receiving a plurality of documents U (e.g., unknown documents), where each document of the plurality of documents U includes content and includes or is associated with a timestamp, and possibly a channel. Further, at 1120, the example method may include initializing data structures Z which will be used to represent selected documents of the plurality of documents U, as outlined below, for example, for purposes of rapid comparison. Additionally, at 1125, the example method may include constructing a queue Q of documents for comparison using serial or parallel approaches. The queue Q may be initialized with documents in the plurality of documents U. Further, for each document A of the queue Q, the example method may include, at 1130, compare the document A to each document B of the data structures Z to update an antecedent table that indicates a most likely (e.g., highest probability) antecedent document.

To update the antecedent table at 1130, an example sub-method illustrated in flowchart 1150 of FIG. 11B may be performed for each document A of the queue Q. In this regard, at 1152, the example method may include selecting a set of documents H for document A from said data structures Z. Thereafter, for each document B of the set of documents H, a comparison of the content of document A with the content of document B may be performed, at 1154, to produce a respective similarity score S(A,B). At 1156, if the similarity score S(A,B) exceeds the threshold T, then operations 1158 to 1164 may be performed.

In this regard, at 1158, the example method may include adding document A to the data structures Z. Further, at 1160, the example method may include determining a document E, which is the document that has an earlier timestamp among document A and document B. Further, at 1162, a determination of document L may be made, which is the document that has the later timestamp among document A and document B. Finally, at 1164, if document L does not have a most likely antecedent M(L) stored or recorded, then the example method may include denoting and storing document E as the most likely antecedent M(L). Otherwise, if the similarity score S(A,B) exceeds the similarity score of S(M(L),L), then the example method includes denoting and storing document E as the most likely antecedent M(L).

Additionally, after the comparison at 1154, an alternative operation may be performed at 1166. In this regard, at 1166, if said similarity score S(A,B) does not exceed the threshold T, but document A passes filter F, then the example method may include adding document A to the data structures Z.

Returning to the example method of flowchart 1100, the example method may continue with the construction of an inferred document causality forest at 1135. Again, to construct the inferred document causality forest, an example sub-method illustrated in flowchart 1170 of FIG. 11C may be performed. In this regard, construction of the inferred document causality forest may include initializing an inferred document causality forest as an empty graph at 1172. The example method may further include, for each document D having a stored or recorded most likely antecedent M(D), adding, at 1174, a causal edge in the inferred document causality forest from a node representing document M(D) to a node representing document D.

According to some example embodiments, the example method of flowcharts 1100, 1150, and 1170 may be modified in a variety of ways according to some example embodiments. For example, according to some example embodiments, the selection of the set of documents H for evaluation with document A may include selecting all documents except document A for the set of documents H. Further, according to some example embodiments, selecting the set of documents H for evaluation with document A may include excluding document A and documents that do not or are unlikely to have a similarity score exceeding the threshold T. According to some example embodiments, each document may also be associated with a channel, and the selection of the set of documents H may include excluding documents having the same channel as document A.

Further, according to some example embodiments, comparing the content of document A with the content of document B may include comparing n-grams of the content of document A with n-grams of the content of document B. Additionally, according to some example embodiments, comparing the content of document A with the content of document B may be based on a Jaccard similarity of the sets of n-grams selectively drawn from documents A and B. Further, selection of the set of documents H for evaluation with document A may be based on bounds of the Jaccard similarity from estimates of document n-gram set sizes. According to some example embodiments, construction of the queue Q of documents for comparison may include constructing the queue Q of documents for comparison by initializing the queue Q with documents within the plurality of documents U, said documents being placed in the queue Q multiple times.

Now referring to FIG. 12, an example embodiment of a method, that processing circuitry 810 may be configured to implement, is provided and illustrated in the flowchart 1200. In this regard, the processing circuitry 810 may be configured to generate an inferred channel causality graph for revealing patterns in story flow and the like as described herein with respect channels. According to some example embodiments, the example method may be performed to generate an inferred document causality forest in any of the manners described herein, and based on the inferred document causality forest, an inferred channel causality graph may be provided.

The example method may include, at 1205, determining a similarity threshold T. The determination of the similarity threshold be may be made in a number of different ways. For example, a similarity analysis may be performed on a representative set of documents to determine the fraction of documents that satisfy the threshold or may be based on experience on what typically constitutes genuine provenance. The threshold may be adjusted to achieve an acceptable compromise between maximizing the recognition of relevant matches and minimizing non-relevant matches. Additionally, at 1210, the example method may include receiving a plurality of documents R (e.g., reference documents), where each document of the plurality of documents R includes content and includes or is associated with a timestamp, and a channel. At 1215, the example method may include receiving a plurality of documents U (e.g., unknown documents), where each document of the plurality of documents U includes content and includes or is associated with a timestamp, and a channel.

The example method may proceed to construct an inferred document causality forest, at 1225. The inferred document causality forest may be constructed based on the plurality of documents R and said plurality of documents U, where each directed link (A,B) indicates that the mostly likely anteced- ent of the document represented by node B is the document represented by node A. Accordingly, the example methods and variations thereof may be employed to construct the inferred document causality forest. Based on the inferred document causality forest, the inferred channel causality graph may be constructed at 1225.

To construct the inferred channel causality graph, the operations 1230 and 1232 may be performed. In this regard, at 1230, the example method may include initializing an inferred channel causality graph as an empty graph. Subse- quently, at 1232, for each causal edge in the inferred document causality forest, where the causal edge extends from a node representing document X to a node representing document Y, the example method may include adding a tie to the inferred channel causality graph extending from a node representing the channel of document X to a node representing the channel of document Y. Accordingly, the operation at 1232 may be repeated for each causal edge of the inferred document causality forest to generate the inferred channel causality graph. According to some example embodiments, the plurality of documents R be the same as the plurality of documents U in the implementation of the example method as provided in FIG. 12.

As mentioned above, the construction of the inferred document causality forest at 1220 may performed in a variety of ways. For example, any of the example methods of FIGS. 9A to 11C may be implement to generate the inferred document causality forest to provide a basis for generating the inferred channel causality graph at 1225.

Additionally, according to some example embodiments, influence measures may also be incorporated in the example methods described herein. In this regard, for example, based on the inferred channel causality graph, the example method may include assigning an influence score to each node in the inferred channel causality graph based on a structure of the inferred document causality forest. The influence score may be determined by the channel represented by the node and the ancestry relationships between channels of the docu- ments represented by nodes in the inferred document cau- sality forest.

Additionally, according to some example embodiments, including those described with respect to FIGS. 9A to 11C, as well as those described below with respect to FIGS. 13A to 13E, a scenario can exist where the timestamps of two documents that meet the similarity threshold are equal (or at least sufficiently equal to be considered as having been published at the same time). In such situations, according to some example embodiments provided herein, causal edges may be constructed within the inferred document causality forest between such documents and the causals edges may be defined with a bidirectional temporal flow. Such bidirec- tional causal edges may define key relationships that may not have otherwise been identified if, for example, equal timestamp relationships were omitted. Additionally, sce- narios may exist where a document may have an equal similarity score with more than one document. In such situations, assumptions may be used based on similarity scores between other documents to select one document as the antecedent document, or, in some instances, multiple antecedent documents may be defined to ensure that all options are captured in the inferred document causality forest.

Having described various example embodiments of meth- ods for determining the provenance of information through document analysis and the construction of inferred docu- ment causality forests, the following provides some further example methods that describe additional embodiments. The example methods described with respect to FIGS. 13A to 13E may be implemented by the processing circuitry 810, and the processing circuitry 810 may be configured to perform the example methods described.

In this regard, with respect to the example method shown in association with the flowchart 1300, an example method for determining a flow of information within a plurality of documents may include, at 1302, receiving the plurality of documents. Each document within the plurality of docu- ments may include document content and a document time- stamp. Further, at 1302, the example method may include constructing an inferred document causality forest based on the plurality of documents by determining causal edges of the inferred document causality forest between the docu- ments based on the document contents and the document timestamps. In this regard, the inferred document causality forest may include a plurality of causal edges extending between nodes that are associated with documents of the plurality of documents. Additionally, the inferred document causality forest may indicate the temporal flow of informa- tion from at least one earliest causal document of the plurality of documents. Further, each causal edge may extend from a node for an antecedent document to a node for a subsequent document that has a similarity above a simi- larity threshold and a timestamp of the antecedent document being earlier in time than a timestamp of the subsequent document. Also, for each causal edge, each antecedent document and each subsequent document may be one of the documents of the plurality of documents.

The determination of the causal edges of the inferred document causality forest may be performed in a number of different ways. In this regard, as provided in the flowchart 1310 of FIG. 13B, determining the causal edges may include, at 1312, determining a similarity set of documents having at least the threshold similarity, and, at 1314, deter- mining a subset of the similarity set of documents that have a timestamp that is before the timestamp of a selected document selected from the similarity set of documents. Additionally, determining the causal edges may include, at 1316, determining an antecedent document to the selected document as having largest similarity with the selected document, and, at 1318, defining a causal edge from the node for the antecedent document to a node for the selected document, where the selected document is the subsequent document for the causal edge.

According to some example embodiments, the determi- nation of the causal edges of the inferred document causality forest may be performed in another way. In this regard, as provided in the flowchart 1320 of FIG. 13C, determining the causal edges may include, at 1322, executing a loop among pairs of documents of the plurality of documents whose similarity satisfy the similarity threshold. In this regard, the example method may include, for each pair of documents, determining an earlier document as a best antecedent docu- ment of a later document if the earlier document is more similar to the later document than a previously-determined best antecedent document of the later document. Further, at 1324, the example method may include, at 1324, construct- ing the causal edges from each best antecedent document and the later document.

According to some example embodiments, the determi- nation of the causal edges of the inferred document causality forest may be performed in yet another way. In this regard, according to some example embodiments, receiving the plurality of documents may include receiving a plurality of reference documents as part of the plurality of documents, where the plurality of reference documents define a basis for the inferred document causality forest. Based on the reference documents, an approach for determining the causal edges may be performed as provided in the flowchart 1330 of FIG. 13D. In this regard, determining the causal edges may include, at 1332, transforming each reference document into a data structure that describes the content of the reference document, and, at 1334, constructing a document queue of unknown documents. Further, determining the causal edges may include, at 1336, performing a comparison of the unknown documents in the queue to the data structures of the reference documents to identify document pairs that exceed the similarity threshold, and, at 1338, recording a similarity score for each pair of documents that have a similarly that exceeds the similarity threshold. Finally, at 1339, determining the causal edges may include determining an antecedent document for a selected document as a document having an earlier timestamp than the selected document and a largest similarity score with the selected document.

Additionally or alternatively, the various example methods described herein may be modified by further including defining a document filter, and, for each unknown document in the document queue with similarity to a reference document that satisfies the similarity threshold or passes the document filter, identifying the unknown document as a reference and recording the document content of the unknown document in the data structures.

According to some example embodiments, aspects associated with channels and influence scores may be additionally or alternatively included in example methods. In this regard, each document in the plurality of documents may be associated with a channel. As provided in the example method associated with flowchart 1340 of FIG. 13E, determining the causal edges may include, at 1342, comparing documents associated with different channels. Further, at 1344, the construction of an inferred channel causality graph may be performed. In this regard, the example method may include, at 1344, constructing, based on the inferred document causality forest, an inferred channel causality graph where each node of the inferred channel causality graph is associated with a different channel to reveal patterns in temporal flow of documents through the different channels. Additionally, with respect to influence scores, the example method may include, at 1346, determining an influence score for each channel represented within the inferred document causality forest based on a quantity of subsequent documents linked to each channel in the inferred document causality forest.

Additionally, with respect to the comparisons performed for similarity, various techniques may be utilized. For example, according to some example embodiments, the example method may include transforming each document in the plurality of documents into a set of n-grams that describe the document content, and performing a comparison of the sets of n-grams of the documents of the plurality of documents to identify documents that exceed the similarity threshold. Alternatively, according to some example embodiments, the example method may include transforming each document in the plurality of documents into a set of n-grams that describe the document content, and performing a comparison of the sets of n-grams of the documents to identify documents that exceed the similarity threshold based on Jaccard similarity analyses and sizes of the sets of n-grams.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method for determining a flow of information within a plurality of documents, the method comprising:
   receiving the plurality of documents, each document within the plurality of documents comprising document content and a document timestamp;
   constructing an inferred document causality forest based on the plurality of documents by determining causal edges of the inferred document causality forest between the documents based on the document contents and the document timestamps, the inferred document causality forest comprising a plurality of causal edges extending between nodes that are associated with documents of the plurality of documents, the inferred document causality forest indicating a temporal flow of information from at least one earliest causal document of the plurality of documents, wherein
   each causal edge extends from a node for an antecedent document to a node for a subsequent document that has a similarity above a similarity threshold and a document timestamp of the antecedent document being earlier in time than a document timestamp of the subsequent document, and
   for each causal edge, each antecedent document and each subsequent document is one of the documents of the plurality of documents,
   wherein each document in the plurality of documents is associated with a channel, and the method further comprises determining an influence score for each channel represented within the inferred document causality forest based on a quantity of subsequent documents of other channels linked to each channel in the inferred document causality forest.

2. The method of claim 1, wherein the determining the causal edges comprises:

determining a similarity set of documents having at least a threshold similarity;

determining a subset of the similarity set of documents that have a document timestamp that is before the document timestamp of a selected document selected from the similarity set of documents;

determining an antecedent document to the selected document as having largest similarity with the selected document; and defining a causal edge from the node for the antecedent document to a node for the selected document, where the selected document is the subsequent document for the causal edge.

3. The method of claim 1, wherein the determining the causal edges comprises:

executing a loop among pairs of documents of the plurality of documents whose similarity satisfy the similarity threshold; wherein, for each pair of documents, determining an earlier document as a best antecedent document of a later document if the earlier document is more similar to the later document than a previously-determined best antecedent document of the later document; and constructing the causal edges from each best antecedent document and the later document.

4. The method of claim 1, wherein the receiving the plurality of documents comprises receiving a plurality of reference documents as part of the plurality of documents, the plurality of reference documents defining a basis for the inferred document causality forest.

5. The method of claim 4, wherein the determining the causal edges comprises:

transforming each reference document into a data structure that describes the content of the reference document;

constructing a document queue of unknown documents;

performing a comparison of the unknown documents in the queue to the data structures of the reference documents to identify document pairs that exceed the similarity threshold;

recording a similarity score for each pair of documents that have a similarly that exceeds the similarity threshold; and determining an antecedent document for a selected document as a document having an earlier document timestamp than the selected document and a largest similarity score with the selected document.

6. The method of claim 5, further comprising:

defining a document filter; and for each unknown document in the document queue with similarity to a reference document that satisfies the similarity threshold or passes the document filter, identifying the unknown document as a reference and record the document content of the unknown document in the data structures.

7. The method of claim 1, wherein the determining the causal edges comprises comparing documents associated with different channels.

8. The method of claim 7 further comprising constructing, based on the inferred document causality forest, an inferred channel causality graph where each node of the inferred channel causality graph is associated with a different channel to reveal patterns in a temporal flow of the documents through the different channels.

9. The method of claim 1, wherein the determining the causal edges comprises:

transforming each document in the plurality of documents into a set of n-grams that describe the document content; and performing a comparison of the sets of n-grams of the documents of the plurality of documents to identify documents that exceed the similarity threshold.

10. The method of claim 1, wherein the determining the causal edges comprises:

transforming each document in the plurality of documents into a set of n-grams that describe the document content; and performing a comparison of the sets of n-grams of the documents to identify documents that exceed the similarity threshold based on Jaccard similarity analyses and sizes of the sets of n-grams.

11. An apparatus for determining a flow of information within a plurality of documents, the apparatus comprising processing circuitry configured to:

receive the plurality of documents, each document within the plurality of documents comprising document content and a document timestamp; and construct an inferred document causality forest based on the plurality of documents by determining causal edges of the inferred document causality forest between the documents based on the document contents and the document timestamps, the inferred document causality forest comprising a plurality of causal edges extending between nodes that are associated with documents of the plurality of documents, the inferred document causality forest indicating a temporal flow of information from at least one earliest causal document of the plurality of documents, wherein each causal edge extends from a node for an antecedent document to a node for a subsequent document that has a similarity above a similarity threshold and a document timestamp of the antecedent document being earlier in time than a document timestamp of the subsequent document, and for each causal edge, each antecedent document and each subsequent document is one of the documents of the plurality of documents, wherein each document in the plurality of documents is associated with a channel, and the processing circuitry is further configured to determine an influence score for each channel represented within the inferred document causality forest based on a quantity of subsequent documents of other channels linked to each channel in the inferred document causality forest.

12. The apparatus of claim 11, wherein the processing circuitry configured to determine the causal edges is further configured to:

determine a similarity set of documents having at least a threshold similarity;

determine a subset of the similarity set of documents that have a document timestamp that is before the document timestamp of a selected document selected from the similarity set of documents;

determine an antecedent document to the selected document as having largest similarity with the selected document; and define a causal edge from the node for the antecedent document to a node for the selected document, where the selected document is the subsequent document for the causal edge.

13. The apparatus of claim 11, wherein the processing circuitry configured to determine the causal edges is further configured to:

execute a loop among pairs of documents of the plurality
of documents whose similarity satisfy the similarity
threshold; wherein, for each pair of documents, deter-
mining an earlier document as a best antecedent docu-
ment of a later document if the earlier document is
more similar to the later document than a previously-
determined best antecedent document of the later docu-
ment; and construct the causal edges from each best antecedent
document and the later document.

14. The apparatus of claim 11, wherein the processing
circuitry configured to receive the plurality of documents is
further configured to receive a plurality of reference docu-
ments as part of the plurality of documents, the plurality of
reference documents defining a basis for the inferred docu-
ment causality forest.

15. The apparatus of claim 14, wherein the processing
circuitry configured to determine the causal edges is further
configured to:

transform each reference document into a data structure
that describes the content of the reference document;

construct a document queue of unknown documents;

perform a comparison of the unknown documents in the
queue to the data structures of the reference documents
to identify document pairs that exceed the similarity
threshold;

record a similarity score for each pair of documents that
have a similarly that exceeds the similarity threshold;
and determine an antecedent document for a selected docu-
ment as a document having an earlier document time-
stamp than the selected document and a largest simi-
larity score with the selected document.

16. The apparatus of claim 15, wherein the processing
circuitry is further configured to:

define a document filter; and for each unknown document in the document queue with
similarity to a reference document that satisfies the
similarity threshold or passes the document filter, iden-
tify the unknown document as a reference and record
the document content of the unknown document in the
data structures.

17. The apparatus of claim 11, wherein the processing circuitry configured to determine the
causal edges is further configured to compare docu-
ments associated with different channels.

18. The apparatus of claim 17, wherein the processing
circuitry is further configured to construct, based on the
inferred document causality forest, an inferred channel cau-
sality graph where each node of the inferred channel cau-
sality graph is associated with a different channel to reveal
patterns in a temporal flow of the documents through the
different channels.

* * * * *